(12) United States Patent
Venkat et al.

(10) Patent No.: US 10,461,347 B2
(45) Date of Patent: Oct. 29, 2019

(54) REAL-TIME MONITORING AND AUTOMATED INTERVENTION PLATFORM FOR LONG TERM OPERABILITY OF FUEL CELLS

(71) Applicant: BLOOM ENERGY CORPORATION, Sunnyvale, CA (US)

(72) Inventors: Aswin Venkat, Belmont, CA (US); Brent Miller, Sunnyvale, CA (US); Prasad Raut, Mumbai (IN); Natarajan Ramanan, San Jose, CA (US); Deepak Shukla, Sunnyvale, CA (US); Andrew Hall, Oakland, CA (US); Pramod Vachhani, Bangalore (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 426 days.

(21) Appl. No.: 15/200,599

(22) Filed: Jul. 1, 2016

(65) Prior Publication Data

US 2017/0012309 A1    Jan. 12, 2017

Related U.S. Application Data

(60) Provisional application No. 62/188,858, filed on Jul. 6, 2015.

(51) Int. Cl.
*H01M 8/04664* (2016.01)
*H01M 8/04082* (2016.01)
(Continued)

(52) U.S. Cl.
CPC ..... *H01M 8/04664* (2013.01); *H01M 8/0432* (2013.01); *H01M 8/04201* (2013.01); *H01M 8/04544* (2013.01); *H01M 8/04626* (2013.01); *H01M 8/04753* (2013.01); *H01M 8/04992* (2013.01); *H01M 8/0618* (2013.01); *H01M 8/0675* (2013.01); *H01M 2008/1293* (2013.01)

(58) Field of Classification Search
None
See application file for complete search history.

(56) References Cited

U.S. PATENT DOCUMENTS 7,422,810 B2    9/2008    Venkataraman et al.
7,599,760 B2    10/2009    Dutta et al.
(Continued)

*Primary Examiner* — Ula C Ruddock
*Assistant Examiner* — Matthew W Van Oudenaren
(74) *Attorney, Agent, or Firm* — The Marbury Law Group, PLLC

(57) ABSTRACT

Methods, apparatuses, and systems for real-time monitoring and automated intervention of a power generation. Embodiments may include receiving operating data from components of the power generation system. A potential failure condition for the components may be determined from real-time operating data of the received operating data before an occurrence of the potential failure condition. An alert may be issued in response to determining the real-time operating data indicates a potential failure condition, and instructions for remedying the potential failure condition may be transmitted to the power generation system. An algorithm for determining whether the real-time operating data indicates the potential failure condition may be updated by using preceding operating data in response to detecting the potential failure condition.

17 Claims, 13 Drawing Sheets

(51) Int. Cl.
  *H01M 8/0432* (2016.01)
  *H01M 8/04537* (2016.01)
  *H01M 8/04746* (2016.01)
  *H01M 8/04992* (2016.01)
  *H01M 8/0612* (2016.01)
  *H01M 8/0662* (2016.01)
  H01M 8/124 (2016.01)

(56) References Cited

U.S. PATENT DOCUMENTS

| | | |
|---|---|---|
| 7,951,496 B2 | 5/2011 | Weingaertner et al. |
| 8,440,362 B2 | 5/2013 | Richards et al. |
| 8,882,101 B2 | 9/2014 | Richards et al. |
| 9,141,923 B2 | 9/2015 | Smith et al. |
| 9,190,673 B2 | 11/2015 | Venkataraman et al. |
| 2003/0143440 A1* | 7/2003 | Tao ............. H01M 8/04186 429/444 |
| 2005/0121315 A1* | 6/2005 | Baltrucki ............. C25B 15/00 204/228.4 |
| 2007/0196704 A1 | 8/2007 | Valensa et al. |
| 2008/0166604 A1* | 7/2008 | Weingaertner .... H01M 8/04992 429/430 |
| 2008/0182139 A1* | 7/2008 | Ganapathy ........ H01M 8/04238 429/413 |
| 2014/0106247 A1* | 4/2014 | Higdon ............... H01M 8/0494 429/417 |
| 2015/0194685 A1 | 7/2015 | Ballantine et al. |

\* cited by examiner

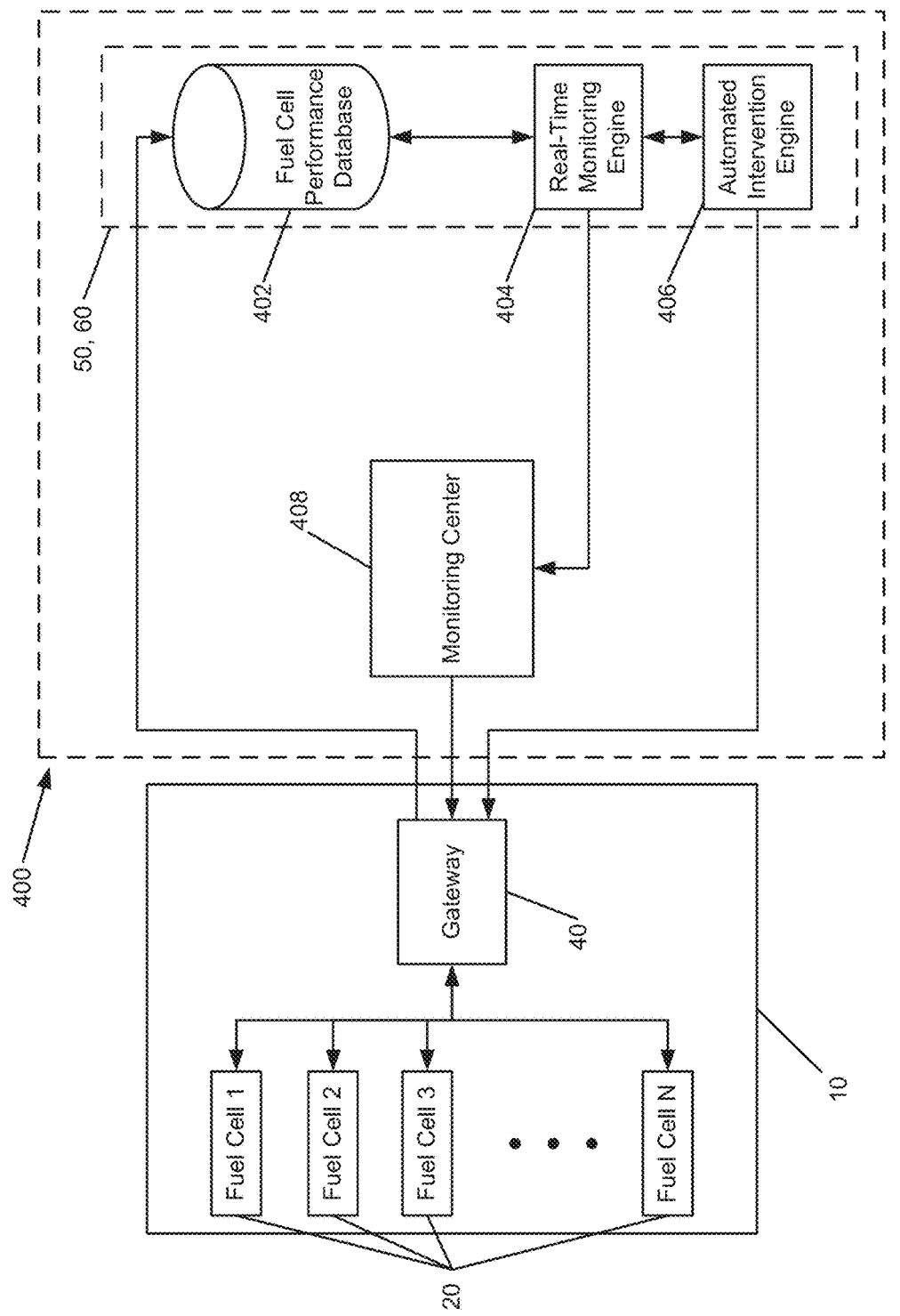

REAL-TIME MONITORING AND AUTOMATED INTERVENTION PLATFORM FOR LONG TERM OPERABILITY OF FUEL CELLS

FIELD

The present disclosure is directed to methods and apparatuses of various embodiments providing methods and circuits, such as a real-time monitoring and automated intervention platform for long term operability of fuel cells for a fuel cell power generator system.

BACKGROUND

Industrial power generation capability may be provided to a customer as a fleet of fuel cell modules that are managed to achieve an objective or a set of objectives. The achievement of the objectives may vary depending on the conditions under which the power generation is provided.

Given the complex interactions between independent variables that can affect the objectives of the fleet, various conditions of the fleet may interrupt or augment the power generation and offset the objectives of the fleet. In various instances, a condition may go unnoticed or may not be fixed while the fleet continues power generation but missing on its objective. In an example a distributed fleet, such as a fleet located in closer proximity to a load than a fleet maintenance provider, may continue to operate under an unintended condition between maintenance intervals without the condition being noticed or fixed.

SUMMARY

A method for monitoring a power generation system, includes receiving operating data from at least one component of the power generation system, determining whether real-time operating data of the received operating data indicates a potential failure condition for at least one of the components before an occurrence of the potential failure condition, issuing a first alert in response to determining the real-time operating data indicates the potential failure condition, transmitting instructions for remedying the potential failure condition to the power generation system, and updating an algorithm for determining whether the real-time operating data indicates the potential failure condition using preceding operating data of the received operating data received before the real-time operating data in response to determining the real-time operating data indicates the potential failure condition.

DESCRIPTION OF THE DRAWINGS

These and other features, aspects and advantages of the present invention will become apparent from the following description, appended claims, and the accompanying exemplary embodiments shown in the drawings, which are briefly described below.

FIG. 4 is a block diagram illustrating a fuel cell system in communication with a real-time monitoring and automated intervention platform according to an embodiment.

DETAILED DESCRIPTION

Embodiments of the present invention will be described below with reference to the accompanying drawings. It should be understood that the following description is intended to describe exemplary embodiments of the invention, and not to limit the invention.

Various components of a power generation system, including a fuel cell module, fuel cell system, and a fuel cell fleet, may be connected to a real-time monitoring and automated intervention platform. The platform may be configured to monitor operating conditions of the components of the power generation system in order to identify potential or occurring failure conditions, issue an alert to a monitor of the power generation system, and transmit instructions for remedying the failure condition. The real-time monitoring and automated intervention platform may further be configured with rule/algorithms for determining the potential or occurring failure conditions, and for determining the instructions for remedying the failure conditions. In some embodiments the real-time monitoring and automated intervention platform may be provided with the rules/algorithms for a limited set of failure conditions, operating conditions, and components of the power generation system. In some embodiments, the real-time monitoring and automated intervention platform may be configured with learning capabilities, such a learning models, which may allow the real-time monitoring and automated intervention platform to improve the accuracy detection and expand detection of the failure conditions, and improve and expand the response to the failure conditions. The real-time monitoring and automated intervention platform may be configured to update existing rules/algorithms and create new rule/algorithms based on historical performance data of the components of the power generation system, and the learning models.

The real-time monitoring and automated intervention platform provides improvement in the long term operability of fuel cells. By detecting potential events quickly, and by mitigating these events in an intelligent and automated manner, the potential for permanent damage to fuel cells is minimized. The real-time monitoring and automated intervention platform has a significant positive impact on the efficiency and durability of the fuel cells.

The algorithms developed for each of the components of the power generation system are adaptive in architecture. Advantages of the real-time monitoring and automated intervention platform include (i) reduced data demands compared to batch techniques, (ii) scaling with system size, (iii) automated and scheduled running of the power generation system and its components on a prespecified basis and, (iv) performance tuning to meet user specifications.

Figure 1:
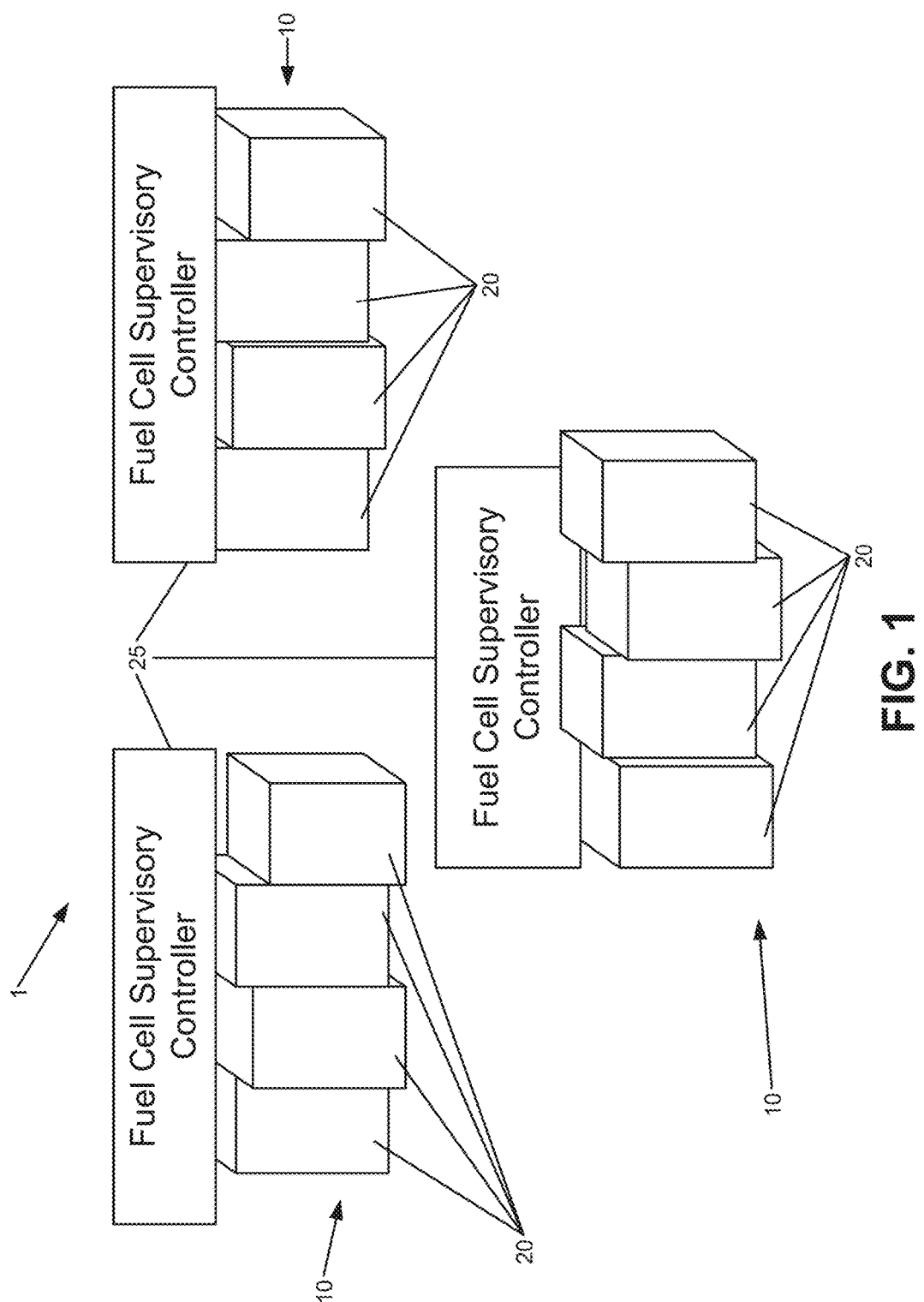
FIG. 1 is a block diagram illustrating a modular power generation system according to an embodiment.
Figure 2:
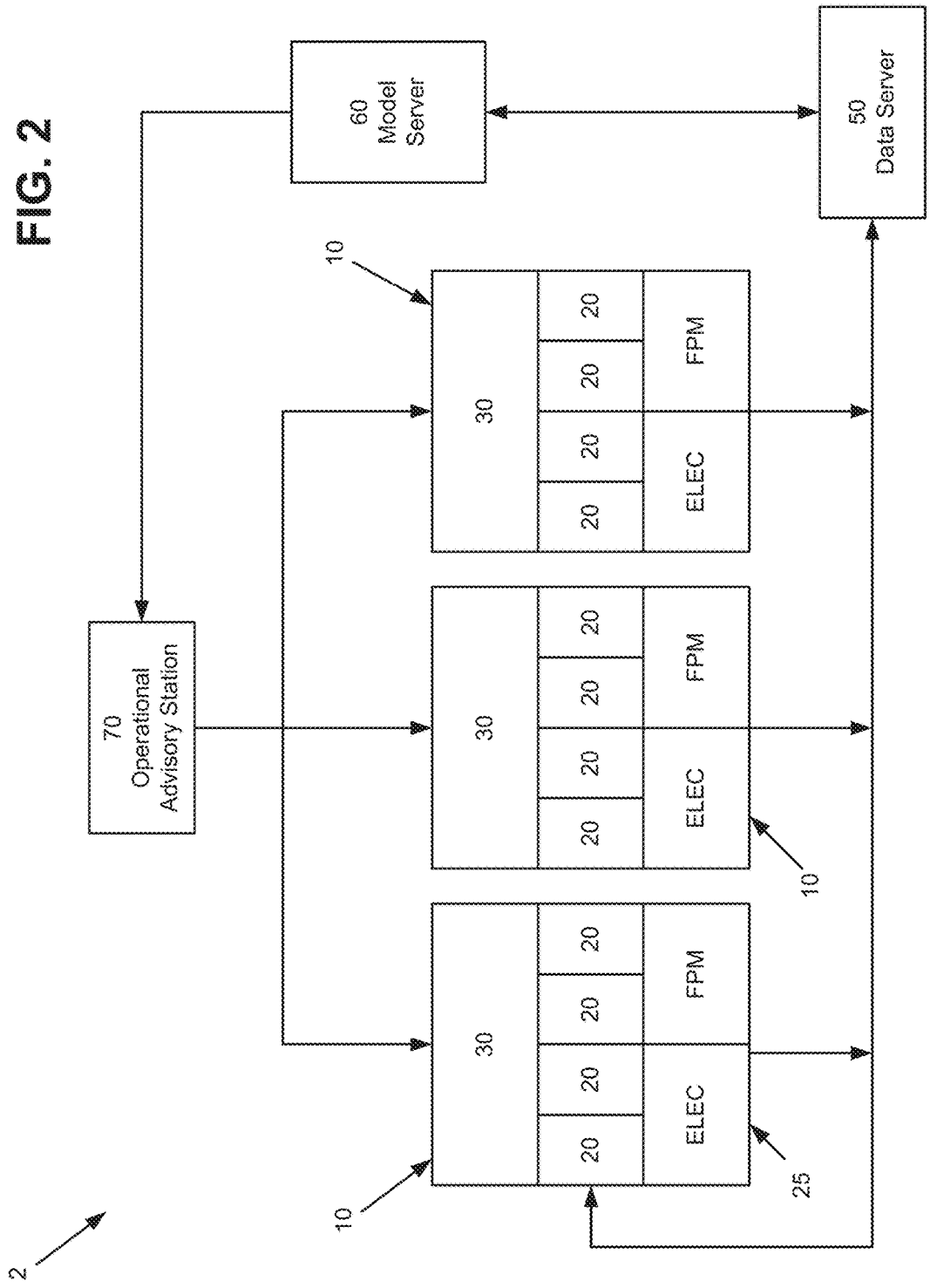
FIG. 2 is a block diagram illustrating a power generation system in communication with a real-time monitoring and automated intervention platform according to an embodiment.
Figure 3:
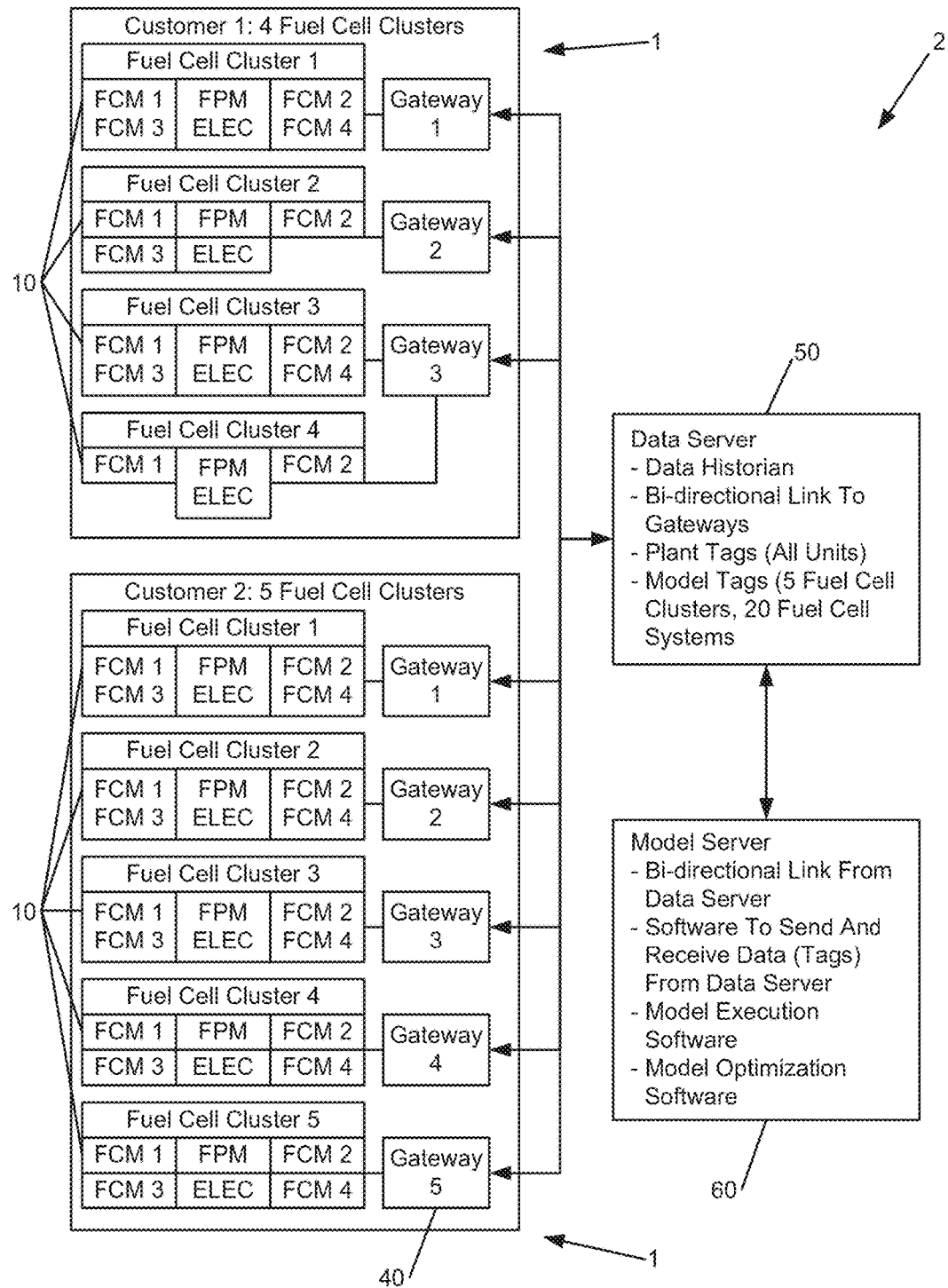
FIG. 3 is a block diagram illustrating a power generation system in communication with a real-time monitoring and automated intervention platform according to an embodiment.

To provide context for the embodiments of the present invention, FIGS. 1-3 from commonly owned U.S. Pat. No. 7,599,760, which patent is incorporated herein by reference, are described below.

FIG. 1 is a block diagram of a modular power generation fleet 1. The power generation fleet 1 is comprised of at least one fuel cell cluster or system 10, which is made up of at least one fuel cell module 20. The terms "system" and "cluster" are used interchangeably herein. For example, three clusters or systems 10 are shown. Each cluster 10 may contain any suitable number of modules, such as one or more modules 20, for example one to twenty modules, preferably four to eight fuel cell modules. Each cluster 10 may also contain optional power conditioning/electronics (i.e., inverters and other electronics) and fuel processing (i.e., fuel treatment, fuel compressors, desulferizers, etc.) modules. Each module 20 contains a plurality of fuel cells, such as two to twenty fuel cell stacks, for example four to eight stacks and associated balance of plant components. A non-limiting example of a module 20 is described in commonly owned U.S. Pat. No. 7,422,810, and U.S. Provisional Patent Application No. 60/760,933, filed Jan. 23, 2006, corresponding to U.S. Published Application Number 2007/0196704 A1, published on Aug. 23, 2007, both herein incorporated by reference. Preferably, each fuel cell module 20 includes a separate cabinet which contains at least one fuel cell stack arranged in one or more columns located in a hot box. Preferably, every column contains plural fuel cell stacks, such as two to ten stacks, for example, four to eight stacks. Preferably, every cabinet contains plural columns, such as two to twenty columns, for example, four to eight columns. One or more, preferably two or more columns connected electrically in series make up a fuel cell segment. There may be two to twenty fuel cell segments, for example four to eight segments, with "+" and "−" electrical outputs in each hot box as described in U.S. Provisional Patent Application No. 61/386,257, filed Sep. 24, 2010, corresponding to U.S. Pat. No. 8,440,362 B2, issued on May 14, 2013, which is incorporated by reference herein in its entirety. The fuel cell modules 20 are electrically and fluidly connected to the at least one fuel processing and power conditioning module. Balance of plant components, such as blowers, valves, and control boards, etc. may be incorporated into the housing and/or the hot box.

A fuel cell supervisory controller 25 is also provided for each cluster 10. The supervisory controller 25 keeps the fuel cell cluster 10 running safely by adjusting various operating parameters, such as the voltage to a blower VFD to maintain a constant air flow rate. The primary objective of the fuel cell supervisory controller 25 is to keep each individual fuel cell module 20 stable during the module's operation. In order to maintain stable operation of each individual fuel cell module 20, the fuel cell supervisory controller 25 controls the operation of each fuel cell module 20 in reference to a number of operational set points. The fuel cell supervisory controller 25 ensures that each fuel cell module 20 operates within an acceptable range of these operational set points, thus maintaining stable operation of each fuel cell module 20. For example, an operator sets some of the set points for the supervisory control 25—e.g. the reformer steam to carbon ratio, or the desired amount of power to be produced. Supervisory control happens on a very fast time scale—adjustments may occur every 100 milliseconds to every couple of seconds.

The fuel cell supervisory controller 25 is capable of controlling each individual fuel cell module 20. At any given point in time, the operating characteristics of a single fuel cell module 20 are different from that of the other fuel cell modules 20 in a system or cluster 10. The stack operating characteristics may include temperatures, pressures, pressure drops, differential pressures, fuel flow rate, power generation (i.e., current or voltage generation by module), fuel utilization, air utilization, etc. The balance of plant (BOP) operating characteristics may include pressures, pressure drops, differential pressures, power consumption (by component or cumulative), heat exchanger temperatures, heat exchanger temperature changes, heat exchanger effectiveness, reformer temperatures, water flow rate, water inventory, steam:carbon ratio, anode recycle flow rate, air flow rates (main flow rate to the fuel cells or flow rate to a fuel exhaust burner or oxidizer), etc.

However, stable operation of each fuel cell module 20 does not necessarily ensure that the power generation fleet 1 as whole is operating in the most economically efficient manner.

FIGS. 2 and 3 show a power generation system 2. The power generation system 2 includes at least one fuel cell cluster 10, such as two to ten clusters, for example, three clusters are shown in FIG. 2. Each fuel cell cluster 10 is made of one or more fuel cell modules (FCM) 20. In particular, a fuel cell cluster 10 is a cluster of fuel cell modules 20 that share a common fuel processing module (FPM) and electronics module (ELEC). The electronics module includes the supervisory controller 25 shown in FIG. 1. Thus, a single fuel cell cluster 10 can be operated independently of other fuel cell clusters 10. The FPM distributes (and if required, treats) fuel from the central feed to a fuel cell cluster 10 to the individual fuel cell modules 20. The ELEC receives the power from one or more fuel cell modules 20, and modifies/conditions the power into a usable form (e.g. modifies the output voltage, transforms DC to AC, etc.).

One or more fuel cell economic controllers 30 may be provided. For example, the system 2 may have a single controller 30. Alternatively, each cluster 10 or each fuel cell module 20 may have a separate economic controller 30, such as a control circuit chip or microcomputer. While the economic controller 30 may comprise the same device as the supervisory controller 25, preferably the controllers 25 and 30 comprise separate devices. The fuel cell economic controller 30 is capable of controlling each individual fuel cell module 20. Each fuel cell cluster 10 is operably connected via a bidirectional link to a data server 50. It should be understood that the bidirectional link and any operable connection mentioned herein may be implemented by any physical wire, cable or fiber optic method as well as wirelessly.

As shown in more detail in FIG. 3, the connection between each fuel cell module 20 and the data server 50 is provided via a gateway 40. Preferably, the gateway 40 is a computer that receives and sends information related to a fuel cell cluster 10 to the data server 50. The gateway 40 may also perform supervisory control. Typically the gateway 40 is located in close physically proximity to the fuel cell cluster (or clusters) 10 that it serves. The data server 50 is operably connected via a bidirectional link to a model server 60. In addition, as shown in FIG. 2, the model server 60 may be operably connected to an operator advisory station 70, such as a display or control panel, which is operably connected to the fuel cell economic controllers 30. The economic control illustrated in FIGS. 2 and 3 does not mimic or replace the supervisory control because some of the set points are arbitrary and they are determined to meet an economic optimum. The economic control can occur on a much slower time scale than supervisory control, for example with economic adjustments occurring less frequently than once every ten minutes, for example once or twice an hour.

FIG. 3 is a block diagram illustrating the optimization of a multiple fuel cell fleets. As illustrated, a customer 1 has four fuel cell systems or clusters 10. A customer 2 has five fuel cell systems 10. Each fuel cell system 10 may have any number of fuel cell modules 20, such as four, fuel processors and electronics modules. A gateway 40 is configured to interface with one or more fuel cell system 10. As shown, a data server 50 is operably connected via a bidirectional link to each gateway 40. Data regarding the operation of each fuel cell system 10 is passed to the gateway 40. The gateway 40 then passes the data to the data server 50. In various embodiments, the operational data may be provided to the data server 50 for multiple levels of the fuel cell systems 10, including operational data for the individual fuel cell modules 20, the individual fuel cell systems 10, and/or the individual fuel cell fleets 1 (such as the fuel cell clusters 10 of customer 1 and/or customer 2). The use of operational data of the fuel cell systems 10 in the descriptions of embodiments herein is meant as a non-limiting example, and the embodiments may be implemented using one or a combination of operating data of the fuel cell modules 20, the fuel cell systems 10, and/or fuel cell fleets 1.

The data server 50 collects data from each fuel cell system 10 during operation. Typically, the data is operational information about the fuel cell system 10 and each fuel cell module 20. The data server 50 receives and stores stack and/or BOP operating data, such as operating temperature, fuel flow rate and utilization, output power, setting, as well as the other operating data/characteristics listed above from multiple fuel cell clusters 10 (possibly from multiple sites and/or multiple customers). The data server 50 can also send data back to the gateway 40, typically the data is in the form of desired operational set points for the fuel cell clusters 10. Either the individual gateway 40 or the data server 50 can also calculate derived properties, e.g. fuel cell efficiency from fuel consumption and power generation. Among other information, the data describes how efficiently the fuel cell system 10 is operating. The data server 50 may also perform a data reconciliation function based on the data received. Operating data from process equipment can be imprecise, inconsistent and/or inaccurate due to instrumentation limitations. Data reconciliation uses relative instrument reliabilities and models that incorporate physical characteristics of the process to adjust the measured values from the instruments to a consistent set of likely, "true" values.

The data server 50 can also send data to and receive data or "tags" from the model server 60. For example, the data server 50 may be configured to store the operational data of numerous fuel cell clusters 10. However, to expedite the modeling and optimization advantages of the model server 60, the data server 50 is configured to selectively provide the model server 60 data pertaining to the specific customer, and or fuel cell cluster 10 of interest. Alternatively, due to bandwidth and/or computer limitations, multiple data servers 50 may be used in conjunction with multiple model servers 60.

The model server 60 is configured to model the operation of the power generation system 2. In addition, based on the data acquired by the data server 50, the model server 60 is configured to perform online optimization of the power generation system 2, i.e., optimize the operation of the power generation system 2 being modeled. The model server 60 is configured to run in real-time concurrent to the operation of the power generation system 2. It should be noted that the terms "real-time", "real-time optimization", and "real-time" as applied to types of data mean that the model uses very recent data but does not mean that the model has to use data from the exact same moment. Thus, the term "real-time" includes within its scope and can be referred to as "near real-time." As shown in FIG. 3, the model server 60 may be configured to optimize the operation of each customer site independently or simultaneously. Alternatively, each customer site may have its own model server 60.

FIG. 4 shows a fuel cell system in communication with an automated intervention platform. Continuing with the examples illustrated in FIGS. 2 and 3, each fuel cell system (or cluster) 10 may be in communication with a real-time monitoring and automated intervention platform 400, via the gateways 40. The real-time monitoring and automated intervention platform 400 may be configured to monitor the real-time operational data/characteristics, including BOP operating characteristics, collected from the individual fuel cell modules 20, the individual fuel cell systems 10, and/or the individual fuel cell fleets 1, identify a potential or occurring failure, and provide instructions for avoiding or remedying the failure and/or an alert to notify a monitor of the potential or occurring failure. The real-time monitoring and automated intervention platform 400 may be provided with algorithms and rules for identifying, avoiding, remedying, or providing an alert for potential and occurring failures. In some embodiments, the real-time monitoring and automated intervention platform 400 may be capable of machine learning that allows the real-time monitoring and automated intervention platform 400 to update and create algorithms and rules for identifying, avoiding, remedying, or providing an alert for potential and occurring failures. The terms failure and fault are used interchangeably herein.

The real-time monitoring and automated intervention platform 400 may include a fuel cell performance database 402, which may store the operational data collected from the individual fuel cell modules 20, the individual fuel cell systems 10, and/or the individual fuel cell fleets 1. In particular, the fuel cell performance database 402 may collect the operational data identified to be associated with potential and occurring failures, or undesired operating conditions. The undesired operating conditions may be linked in the fuel cell performance database 402 to related potential and occurring failures in general for the various levels of the power generation system 2 (e.g., the fuel cell modules 20, the fuel cell systems 10, and/or the fuel cell fleets 1), or for specific fuel cell modules 20, the fuel cell systems 10, and/or fuel cell fleets 1 of the power generation system 2. The undesired operating conditions stored in the fuel cell performance database 402 may represent threshold values for delineating when operating conditions of the components 1, 10, and/or 20 of the power generation system 2 are operating under acceptable operating conditions and when the components 1, 10, and/or 20 are operating under potential or occurring failure conditions. The undesired operating conditions stored in the fuel cell performance database 402 may represent operating conditions collected during a failure condition in the power generation system 2 that may or may not be associated with algorithms and rules for avoiding and remedying the failure condition. In various embodiments, the fuel cell performance database 402 may similarly store and correlate operating conditions of the components 1, 10, and/or 20 of the power generation system 2 for a period after remedying the failure. In various embodiments, real-time monitoring and the automated intervention platform 400 may use the undesired operating conditions, and in some embodiments, the operating conditions after remedying the failure, to update or develop algorithms and rules for avoiding and remedying the failure condition. In various embodiments, the fuel cell performance database 402 may store the rules and algorithms associated with the failure conditions, and in some embodiments specific components 1, 10, and/or 20. In various embodiments, the fuel cell performance database 402 may store responses or remedies to potential or occurring failure conditions for various circumstances. The fuel cell performance database 402 may be implemented using at least one persistent storage device, such as the memories described herein.

A real-time monitoring engine 404 may be included as part of the real-time monitoring and automated intervention platform 400 and may be configured to implement, update, and/or develop the algorithms and rules for identifying, avoiding, or providing an alert for potential and occurring failures in the power generation system 2. Such algorithms and rules may be programmed to the real-time monitoring engine 404 for various failures. For failures without algorithms and rules, the real-time monitoring engine 404 may correlate the operating conditions collected leading up to, during, and after remedying a failure condition with the failure condition, and develop algorithms and rules for the failure. In various embodiments, the real-time monitoring engine 404 may receive the operating data from one or more components 1, 10, and/or 20 at the various levels of the power generation system 2. The real-time monitoring engine 404 may receive the operating data from the fuel cell performance database 402 or from the components 1, 10, and/or 20 via the gateway 40. The operating data received from the components 1, 10, and/or 20 of the power generation system 2 may be compared to various rules or run through various algorithms used for predicting potential or identifying occurring failure conditions for the components 1, 10, and/or 20. In various embodiments, to implement the rules and algorithms for a specific failure condition, the real-time monitoring engine 404 may retrieve the undesired operating conditions, and in some embodiments the rules or algorithms, associated with the failure condition. Embodiments of the real-time monitoring engine 404 may use a variety of resources to determine when and which undesired operating conditions, and in some embodiments the rules or algorithms, to retrieve. Such resources may include accepted and/or failure operating ranges for certain operating parameters for the various components 1, 10, and/or 20 of the power generation system 2. The resources may be correlated with one or more potential or occurring failure conditions. Based on comparing the operating data received by the real-time monitoring engine 404 with the resources, the real-time monitoring engine 404 may identify and retrieve the relevant undesired operating conditions and/or rules or algorithms for the potential or occurring failure(s).

Whether the rules or algorithms are retrieved (e.g., from the fuel cell performance database 402) or preloaded (e.g., pre-programmed), the real-time monitoring engine 404 may implement the rules or algorithms using the received operational data (e.g., from the gateway 40 or the fuel cell performance database 402) to identify the potential or occurring failure, and the cause of the potential or occurring failure. Results of implementing the rules or algorithms using the received operational data may be used to identify which failure condition is potential or occurring, and which component 1, 10, and/or 20 is exhibiting the undesired operating condition and why. The real-time monitoring engine 404 may determine from the results to raise an alert indicating any combination of what the failure condition is, whether the failure condition is potential or occurring, and the component 1, 10, and/or 20, and/or the cause of the undesired operating condition. In some embodiments, the alert may be provided to a monitoring center 408, which may include the operator advisory station 70, to notify the operator. In some embodiments, the operator may be prompted to react to the alert to remedy the potential or occurring failure. In some embodiments, the results may trigger one or more alerts, and multiple alerts relating to the same failure condition may be suppressed in favor of a single alert based on repetitive alerts or a priority of the alerts relating to various failure conditions, or combined into a single alert. In various embodiments, the real-time monitoring engine 404 may also or alternatively provide the alert(s) to an automated intervention engine 406.

The automated intervention engine 406 may receive one or more alerts from the real-time monitoring engine 404, providing the automated intervention engine 406 with information it may use to provide instructions to one or more components 1, 10, and/or 20 of the power generation system 2 to correct the undesired operating condition(s), and thereby avoid or correct the failure condition. The alert may provide the automated intervention engine 406 with whether the failure condition is potential or occurring, what the failure condition is, the component 1, 10, and/or 20 related to the failure condition, and/or the cause of the undesired operating condition. In other embodiments, the alert may provide an indication about a potential or occurring failure condition to the automated intervention engine 406, triggering the automated intervention engine 406 to retrieve or determine what the failure condition is, the component 1, 10, and/or 20 related to the failure condition, and/or the cause of the undesired operating condition. The automated intervention engine 406 may use the provided, retrieved, or determined information to determine a response to the alert.

In various embodiments, the automated intervention engine 406 may be configured to implement, update, and/or develop algorithms and rules for remedying potential and occurring failures in the power generation system 2. Such algorithms and rules may be programmed to the automated intervention engine 406 for various alert information. For alerts for failure conditions without algorithms and rules, the automated intervention engine 406 may correlate the operating conditions after attempts to remedy the cause of an alert with a remedial act that causes an improvement in operating conditions, a return to standard operating conditions, or cancelation of the alert, and develop algorithms and rules for remedies of or responses to the cause of the alert. The remedies/responses may include instructions for one more of the components 1, 10, and/or 20 to change one or more operating parameters, including levels of inputs, outputs, and states of operation of part or all of the component 1, 10, and/or 20. The automated intervention engine 406 may send the instructions to the component(s) 1, 10, and/or 20, via the gateway 40, to be received an implemented by the controllers and modules for the component(s) 1, 10, and/or 20 (e.g., the fuel cell supervisory controller 25, the fuel cell economic controller 30, the fuel processing module, and electronics module).

While the operator and/or automated intervention engine 406 respond to the alert, the real-time monitoring engine 404 may continue to monitor and analyze the operational data of the component(s) 1, 10, and/or 20 to determine whether the issue raised by the alert is rectified. While the issue is not yet rectified, the real-time monitoring engine 404 may continue to raise the alert or not provide any change in the alert status. In response to the real-time monitoring engine 404 determining from the operational data and rules or algorithms that the issue raised by the alert is rectified, the real-time monitoring engine 404 may stop issuing or cancel the alert.

At various times, such as during a potential or occurring failure condition that has been identified by the real-time monitoring engine 404, or after responding to the alert by the automated intervention engine 406, learning models may be used to update the rules/algorithms for predicting potential or identifying occurring failure conditions for the components 1, 10, and/or 20, and for remedying potential or occurring failures. The real-time monitoring engine 404 and the automated intervention engine 406 may be configured to use learning models with the operational data observed from the components 1, 10, and/or 20, to update parameters that are used with the rules/algorithms for predicting potential or identifying occurring failure conditions and for remedying potential or occurring failures. In an embodiment, the real-time monitoring engine 404 may use the operational data received leading up to the identification of a potential or occurring failure to improve its capabilities of identifying the potential or occurring failure. For example, the operational data received leading up to the identification of a potential or occurring failure may show an abnormal reading not usually associated with the relevant failure condition. The learning model may use that information to modify parameters of the rules/algorithms for identifying the potential or occurring failure condition. Similarly, the operational data received leading up to the identification of a potential or occurring failure may show a reading of an earlier sign of the relevant failure condition, and the learning model may use that information to modify parameters of the rules/algorithms for identifying the potential or occurring failure condition.

In an embodiment, the automated intervention engine 406 may use the operational data received after sending instructions for remedying an identified potential or occurring failure to improve its capabilities of remedying the potential or occurring failure. For example, the operational data received after sending instructions for remedying a potential or occurring failure may show an improved reading in the operating data compared to the operating data used in identifying the relevant failure condition. The learning model may use that information to modify parameters of the rules/algorithms for remedying the potential or occurring failure condition.

In any of the above described embodiments, repeated patterns exhibited in the operational data associated with a failure condition and/or remedy may be used by the learning models to strengthen the correlation between those patterns and the relevant failure condition and/or its remedy. The learning models may use the patterns of information to modify parameters of the rules/algorithms such that certain parameters may be made weightier than parameters linked to operating conditions that are observed less frequently for the relevant failure condition and/or its remedy.

In various embodiments, the real-time monitoring engine 404, and/or the automated intervention engine 406 may be implemented as general purpose or specialized hardware, such as the processors described herein, as software executed on the general purpose or specialized hardware, or a combination of the hardware and software. In various embodiments, any combination of the fuel cell performance database 402, the real-time monitoring engine 404, and/or the automated intervention engine 406 may be included in one or a combination of the data server 50 and the model server 60, and/or as separate or combined components of the real-time monitoring and automated intervention platform 400. The fuel cell performance database 402, the real-time monitoring engine 404, and/or the automated intervention engine 406 may communicate with each other and the gateway 40, the data server 50, the model server 60, and monitoring center 408 via the network access components and network described herein. In various embodiments, the real-time monitoring and automated intervention platform 400 may include various combination of the fuel cell performance database 402, the real-time monitoring engine 404, and/or the automated intervention engine 406 dedicated to and/or located at various respective fuel cell fleets 1 or fuel cell systems 10, such that each fuel cell fleet 1 or fuel cell system 10 may be monitored and automatically managed individually or in combination with other fuel cell fleets 1 or fuel cell systems 10 by the real-time monitoring and automated intervention platform 400. As such, the real-time monitoring and automated intervention platform 400 may be scalable for varying numbers of and growing fuel cell fleets 1 or fuel cell systems 10.

Figure 5A:
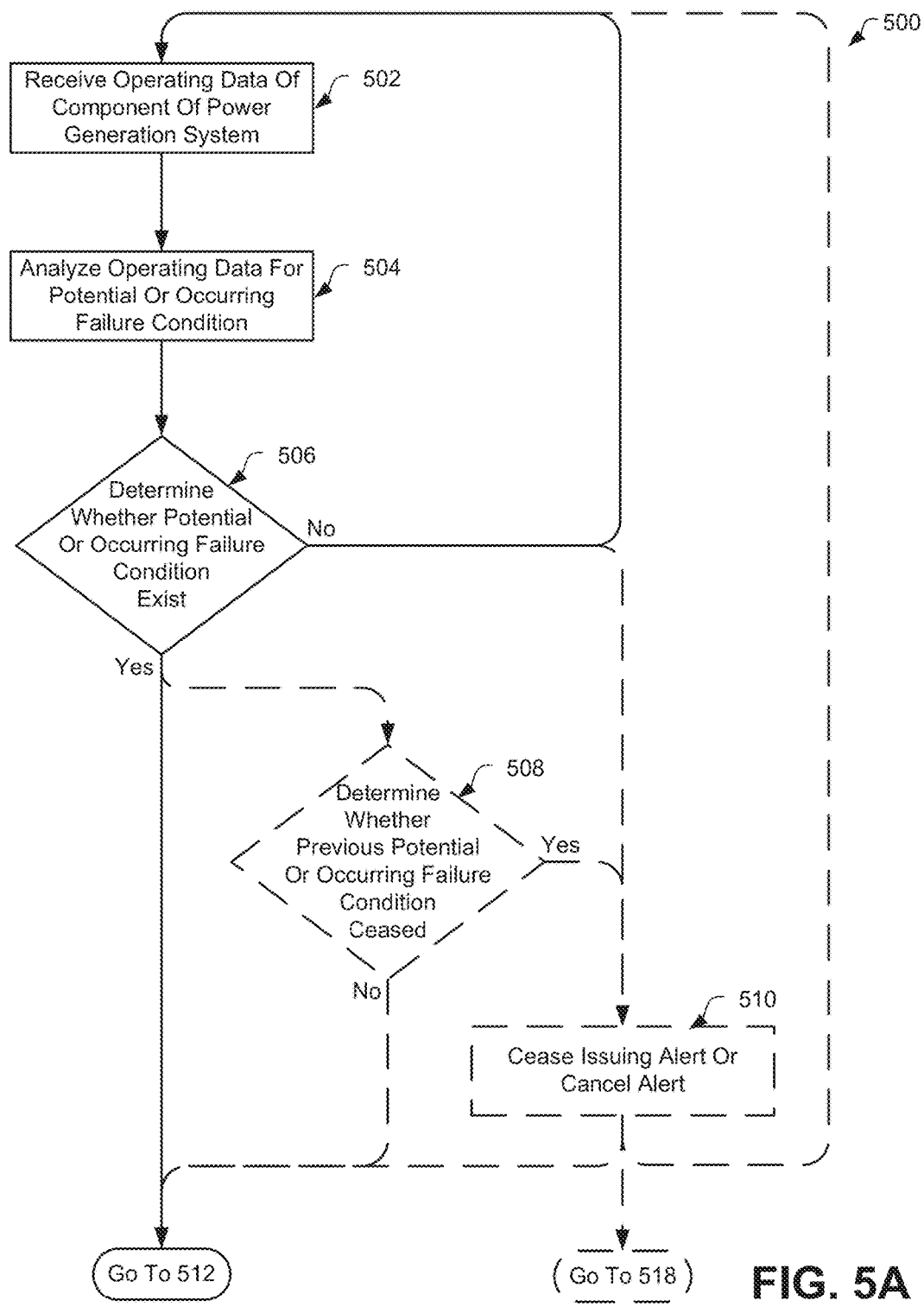
FIGS. 5A and 5B are flow charts illustrating a method for real-time monitoring and automated intervention according to an embodiment.
Figure 5B:
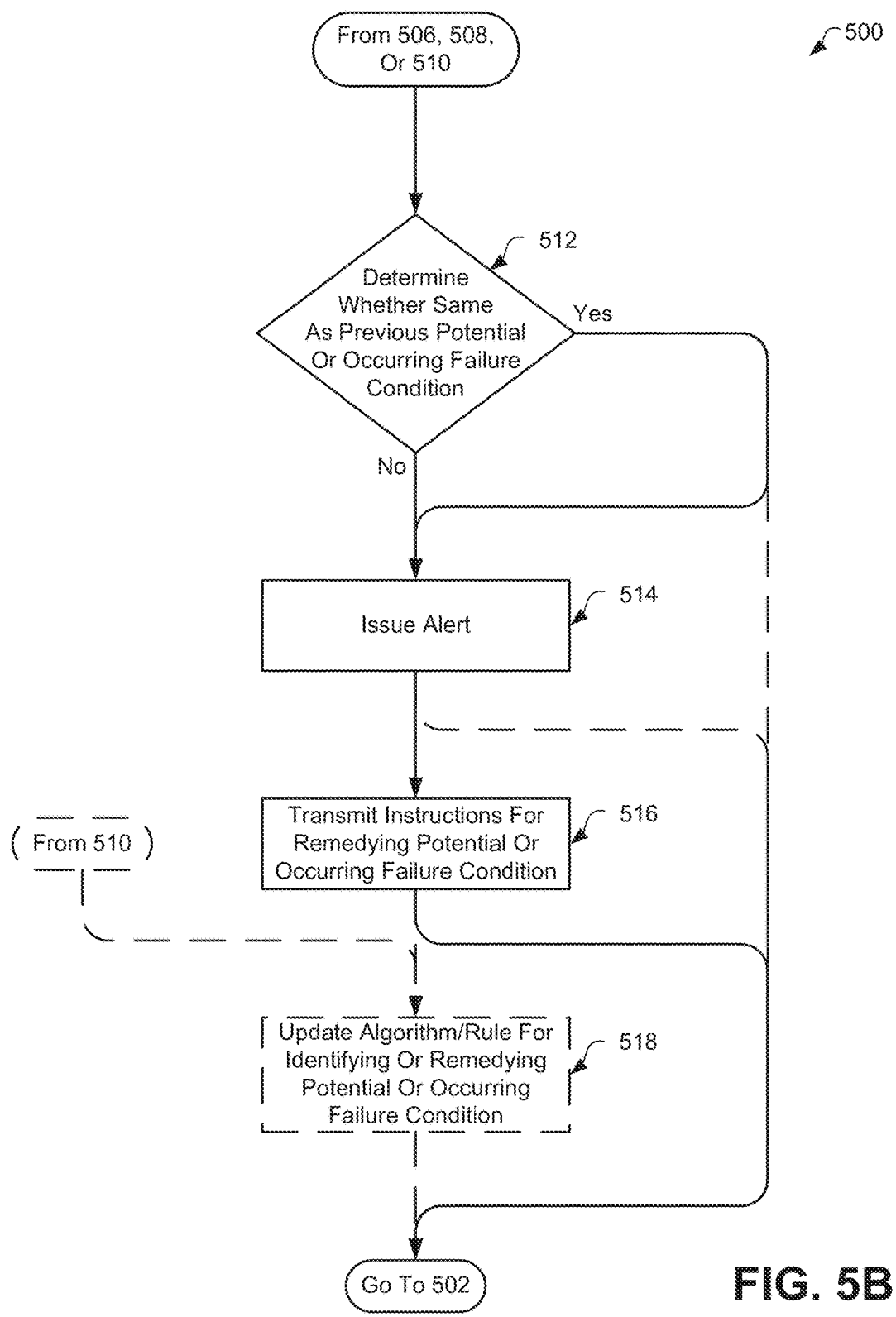

FIGS. 5A and 5B illustrate a method 500 for real-time monitoring and automated intervention according to an embodiment. The method 500 may be implemented by the real-time monitoring and automated intervention platform 400 as described herein, such as by the real-time monitoring engine 404, the automated intervention engine 406, the processor, the data server 50, and the model server 60. In block 502 the platform 400 may receive operating data of one or more components 1, 10, and/or 20 of the power generation system 2. As described herein, the operating data may be for any of or any combination of fuel cell fleets 1, fuels cell systems 10, and fuel cell modules 20. In a non-exhaustive example, the operating data may include pressures, pressure drops, differential pressures, fuel flow rate, power generation (i.e., output current or voltage generation), fuel utilization, air utilization, power consumption (by component or cumulative), heat exchanger, fuel exhaust oxidizer (also known as an anode tailgas oxidizer (ATO)) temperatures, heat exchanger, anode tailgas oxidizer temperature changes (e.g., as described in U.S. application Ser. No. 14/054,010, filed Oct. 15, 2013, corresponding to U.S. Published Application Number 2014/0106247 A1, published on Apr. 17, 2014, incorporated herein by reference in its entirety), heat exchanger effectiveness, reformer temperatures, water flow rate, water inventory, steam:carbon ratio, anode recycle flow rate, air flow rates (main flow rate to the fuel cells or air exhaust flow rate to a fuel exhaust oxidizer), etc. The platform 400 may receive the operating data via a network connecting to the platform 400 and the components 1, 10, and/or 20. In an embodiment, the operating data may be received and stored in the fuel cell performance database 402, and the platform 400 may retrieve the operating data from the fuel cell performance database 402. In various embodiments, the platform 400 may continually or periodically receive the operating data of the components. The operating data may be real-time operating data, which in various embodiments may be operating data that is representative of the operating condition of the components close-in-time. In other words, real-time operating data may or may not be instantaneous operating data. The real-time operating data may be close-in-time resulting from lag in transmitting the operating data to the platform 400, and lag in any processing of the data, such as storing and retrieving the data from the fuel cell performance database 402.

In block 504, the platform 400 may analyze the operating data for potential or occurring failure conditions. The platform 400 may apply rule/algorithms to the operating data to determine whether the operating data is indicative of a potential or occurring failure condition. Analyzing the operating data for potential or occurring failure conditions is described in greater detail below in a method 600 described with reference to FIG. 6. In determination block 506 the platform 400 may determine whether a potential or occurring failure condition exists among the components 1, 10, and/or 20. This determination may rely on the results of the analysis of the operating data in block 504. In response to determining that a potential or occurring failure condition does exist (i.e., determination block 506="Yes"), the platform 400 may determine whether the potential or occurring failure condition is the same as a previous potential or occurring failure condition in determination block 512. In an embodiment, the previous potential or occurring failure conditions is one that is previously identified but yet to be rectified. In other words, the previous potential or occurring failure condition is still a potential or occurring failure condition related to the analyzed operating data. As such, determining that the potential or occurring failure condition and the previous potential or occurring failure condition are the same indicates that the operating data is indicating that the potential or occurring failure condition subsists from a previous analysis. In some embodiments, rather than proceeding directly to whether the potential or occurring failure condition is the same as a previous potential or occurring failure condition in determination block 512, in response to determining that a potential or occurring failure condition does exist (i.e., determination block 506="Yes"), the platform 400 may determine whether a previous potential or occurring failure condition has ceased in determination block 508, as described further below.

In some embodiments, in response to determining that the potential or occurring failure condition is the same as a previous potential or occurring failure condition (i.e., determination block 512="Yes"), the platform 400 may proceed with receiving operating data of one or more components 1, 10, and/or 20 of the power generation system 2 in block 502. In some embodiments, in response to determining that the potential or occurring failure condition is the same as a previous potential or occurring failure condition (i.e., determination block 512="Yes"), the platform 400 may issue an alert in block 514. Similarly, in response to determining that the potential or occurring failure condition is not the same as, or is different from, a previous potential or occurring failure condition (i.e., determination block 512="No"), the platform 400 may issue an alert in block 514. The alert may take various forms as described above. In an embodiment, the alert may indicate any combination of what the failure condition is, whether the failure condition is potential or occurring, and the component 1, 10, and/or 20, and/or the cause of the undesired operating condition. In some embodiments, one or more alerts may be raised in response to the determinations in blocks 506 and 512, and multiple alerts may relate to the same or a related potential or occurring failure condition. In some embodiments, the multiple alerts relating to the same failure condition may be suppressed in favor of a single alert or combined into a single alert. In some embodiments the alerts may be associated with a priority based on the related failure condition, and an alert with a lower priority may be suppressed in favor of an existing or following alert of higher priority. In some embodiments, the alert may be provided to the monitoring center 408 to notify the operator, and the platform 400 may proceed with receiving operating data of one or more components 1, 10, and/or 20 of the power generation system 2 in block 502. In some embodiments, whether or not the alert is provided to the monitoring center 408, in block 516 the alert may prompt the platform 400 to transmit instructions for remedying the potential or occurring failure condition to the relevant components 1, 10, and/or 20, including their various controllers and modules (e.g., the fuel cell supervisory controller 25, the fuel cell economic controller 30, the fuel processing module, and electronics module). Transmitting instructions for remedying the potential or occurring failure condition is described in greater detail below in a method 700 described with reference to FIG. 7.

In some embodiments, the platform 400 may proceed with receiving operating data of one or more components 1, 10, and/or 20 of the power generation system 2 in block 502. In some embodiments, in block 518 the platform 400 may update the algorithm/rule for identifying or remedying the potential or occurring failure condition. Updating the algorithm/rule for identifying or remedying the potential or occurring failure condition is described in greater detail below in methods 800, 900 described with reference to FIGS. 8 and 9. The platform 400 may proceed with receiving operating data of one or more components 1, 10, and/or 20 of the power generation system 2 in block 502.

In some embodiments, in response to determining that a potential or occurring failure condition does not exist (i.e., determination block 506="No"), the platform 400 may proceed with receiving operating data of one or more components 1, 10, and/or 20 of the power generation system 2 in block 502. In some embodiments, in response to determining that a potential or occurring failure condition does not exist (i.e., determination block 506="No"), the platform 400 may cease issuing an alert or cancel an alert for a previous potential or occurring failure condition in block 510. As described above, there may be many forms of alerts, some of which may be persistent alerts that are persistently or repeatedly issued until the identified potential or occurring failure condition is remedied. In such embodiments, it may be appropriate to cease issuing the alert in response to no longer detecting the potential or occurring failure condition. For alerts only issued once, or less frequently than the persistent alert, it may be appropriate to cancel the alert by issuing cancelation in response to no longer detecting the potential or occurring failure condition. In these embodiments, ceasing to issue or cancelling the alert for a previous potential or occurring failure condition may prompt the platform 400 to stop attempting to remedy the failure condition, for example by stopping transmitting instructions for remedying the potential or occurring failure condition to the relevant components 1, 10, and/or 20. In some embodiments, cancelling an alert may include issuing an alert signifying a return to accepted operating conditions. In some embodiments, the platform 400 may proceed with determining whether the potential or occurring failure condition is the same as a previous potential or occurring failure condition in determination block 512. In some embodiments, the platform 400 may proceed with updating the algorithm/rule for identifying or remedying the potential or occurring failure condition in block 518. In some embodiments, the platform 400 may proceed with receiving operating data of one or more components 1, 10, and/or 20 of the power generation system 2 in block 502.

As noted above, in some embodiments, in response to determining that a potential or occurring failure condition does exist (i.e., determination block 506="Yes"), the platform 400 may determine whether a previous potential or occurring failure condition has ceased in determination block 508. The platform 400 may determine that the previous potential or occurring failure condition has ceased from results of the analysis of the operating data in block 504. In other words, following an analysis of the operating conditions indicating the previous potential or occurring failure condition, a later analysis of later operating conditions may not indicate the same potential or occurring failure condition. In response to determining that the previous potential or occurring failure condition has not ceased, or subsists, (i.e., determination block 508="No"), the platform 400 may proceed with determining whether the potential or occurring failure condition is the same as a previous potential or occurring failure condition in determination block 512. In response to determining that the previous potential or occurring failure condition has ceased, or subsist, (i.e., determination block 508="Yes"), the platform 400 may proceed with ceasing issuing an alert or cancelling an alert for a previous potential or occurring failure condition in block 510.

Figure 6:
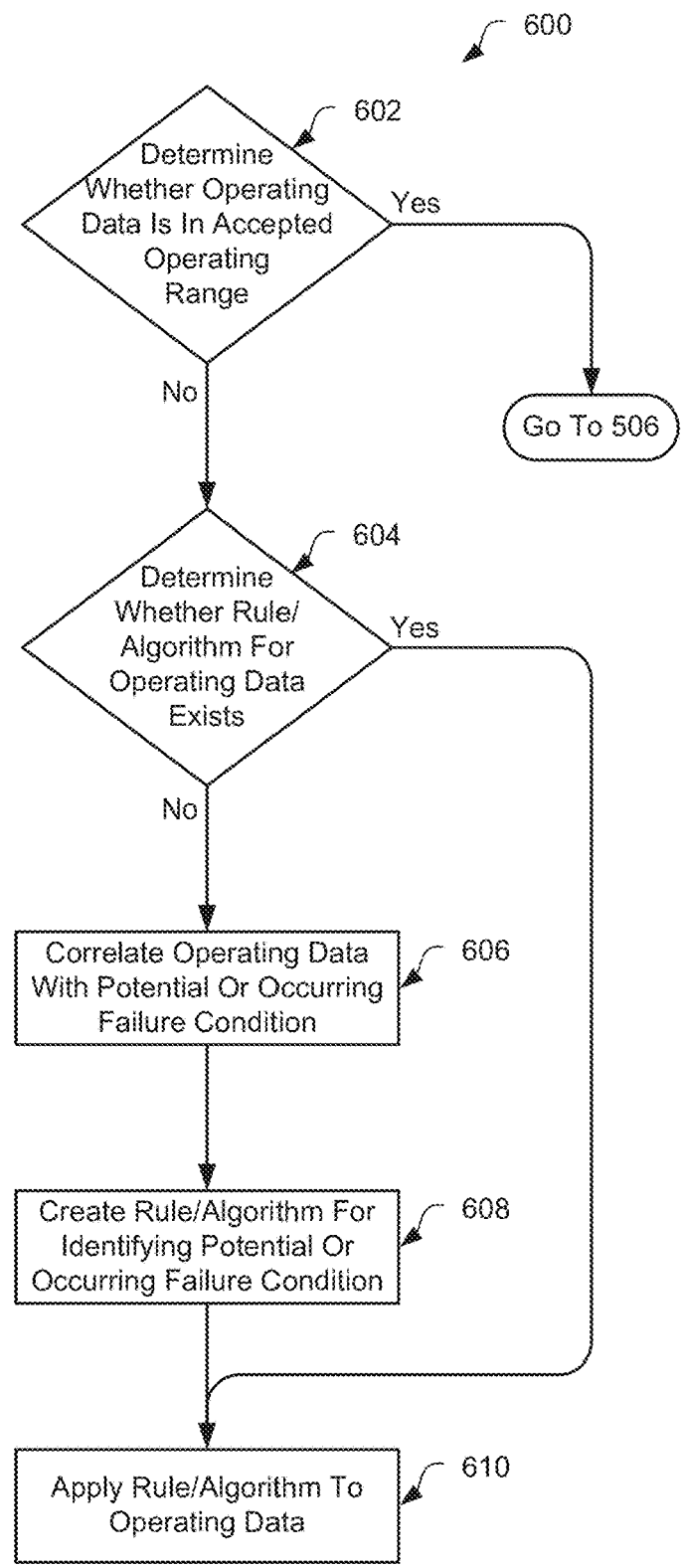
FIG. 6 is a flow chart illustrating a method for analyzing operating data for a potential or occurring failure condition according to an embodiment.

FIG. 6 illustrates a method 600 for analyzing operating data for a potential or occurring failure condition according to an embodiment. The method 600 may be implemented by the real-time monitoring and automated intervention platform 400 as described herein, such as by the real-time monitoring engine 404, the automated intervention engine 406, the processor, the data server 50, and the model server 60. The method 600 may be implemented as a part of block 504 of method 500 in FIG. 5A. In determination block 602 the platform 400 may determine whether the operating data is in an accepted operating range. As discussed above, the operating data may include a variety of data from any of or any combination of the components 1, 10, and/or 20, including their various controllers and modules (e.g., the fuel cell supervisory controller 25, the fuel cell economic controller 30, the fuel processing module, and electronics module). Any of or any combination of the operating data may be received and compared individually or in combination to one or more accepted operating ranges. The received operating data may be manipulated using algorithms to transform the operating data into representative values of operation for comparison with operating ranges for those representative values of operation. In response to determining that the operating data is in an accepted operating range (i.e., determination block 602="Yes"), the platform 400 may proceed with determining whether a potential or occurring failure condition does exist in determination block 506 in FIG. 5A.

In response to determining that the operating data is not in an accepted operating range (i.e., determination block 602="No"), the platform 400 may determine whether a rule/algorithm for the operating data exists for the operating data in determination block 604. As described herein, the platform 400 may be provided with rules/algorithms for analyzing certain operating data and/or responding to certain failure conditions. However, other operating data and/or failure conditions may not be associated with provided rules/algorithms. As such, the platform 400 may be capable of learning how to analyze the operating data and respond to identified potential or occurring failure conditions using learning models for creating and updating the rules/algorithms for the operating data and/or failure conditions. To apply rules/algorithms for analyzing operating data, the platform 400 may retrieve relevant existing rules/algorithms from a memory, such as the fuel cell performance database 402 or other storage device. In response to determining that a rule/algorithm for the operating data exists for the received operating data (i.e., determination block 604="Yes"), the platform 400 may apply the rule/algorithm to the operating data in block 610. Depending on the rule/algorithm, any form or combination of the operating data may be used as inputs for the relevant rule/algorithm to output a value which allows the platform 400 to make the determination whether a potential or occurring failure condition does exist in determination block 506 in FIG. 5A.

In response to determining that a rule/algorithm for the operating data does not exist for the received operating data (i.e., determination block 604="No"), the platform 400 may correlate the operating data with a potential or occurring failure condition in block 606. Without an existing rule/algorithm for the operating data to provide a value which allows the platform 400 to make the determination whether a potential or occurring failure condition does exist, a rule/algorithm may be created. In an embodiment, certain operating data being outside of the accepted operating ranges may be indicative of one or more failure conditions. Thus, the operating data may be correlated with the relevant potential or occurring failure conditions. In block 608 the platform 400 may create a rule/algorithm for identifying the potential or occurring failure condition from the correlated operating data. The platform 400 may use the learning models to create the rules/algorithms for using the operating data to identify the failure conditions. In block 610 the platform 400 may apply the rule/algorithm to the operating data. By applying the rule/algorithm to the operating data and continuing with the rest of the method 500 in FIGS. 5A and 5B, the platform 400 may further refine the rules/algorithms to determine which operating data is more or less indicative of the failure conditions to which they are associated, as described further with reference to a method 800 described relating to FIG. 8.

Figure 7:
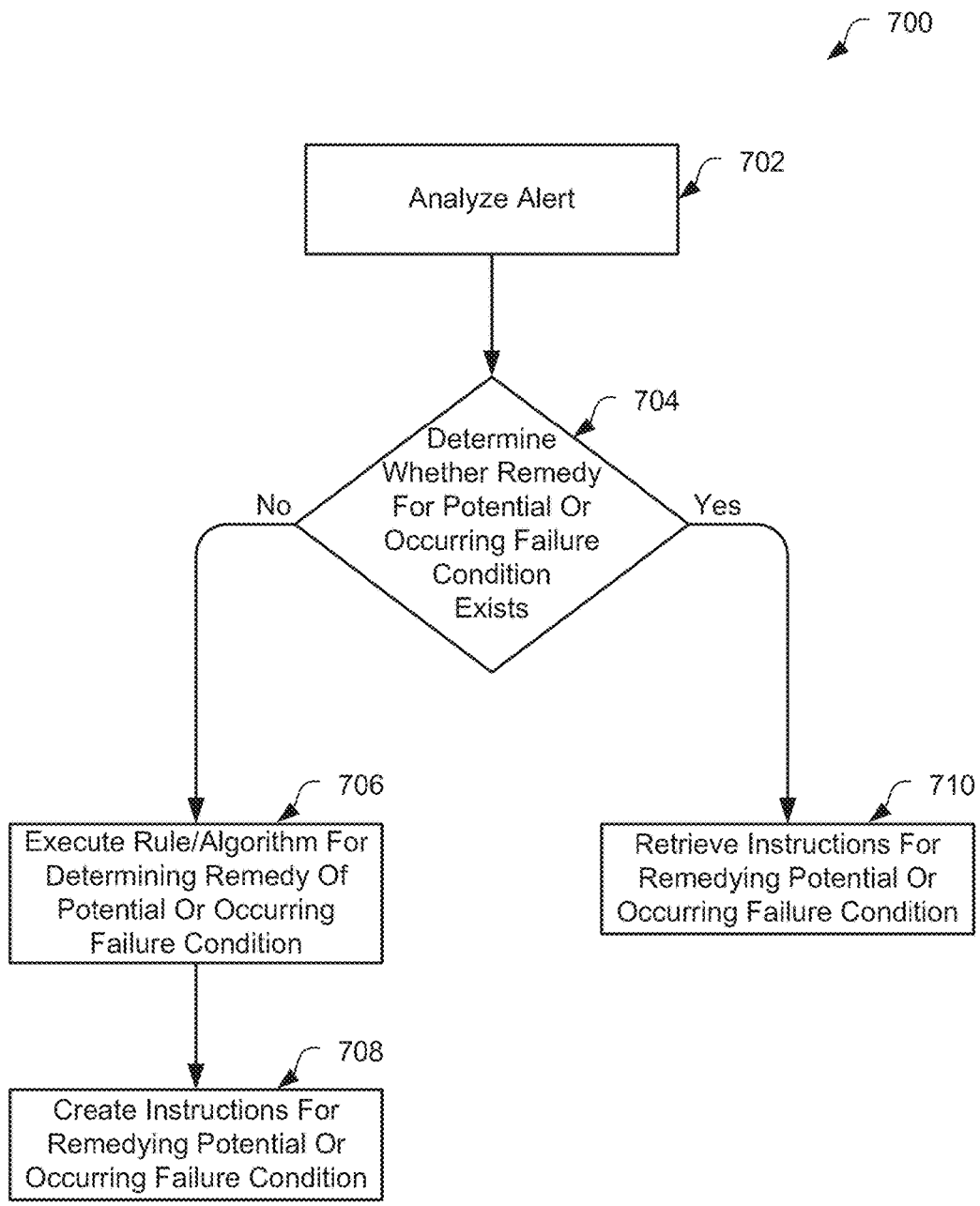
FIG. 7 is a flow chart illustrating a method for transmitting instructions for remedying a potential or occurring failure condition according to an embodiment.

FIG. 7 illustrates a method 700 for transmitting instructions for remedying a potential or occurring failure condition according to an embodiment. The method 700 may be implemented by the real-time monitoring and automated intervention platform 400 as described herein, such as by the real-time monitoring engine 404, the automated intervention engine 406, the processor, the data server 50, and the model server 60. The method 700 may be implemented as a part of block 516 of method 500 in FIG. 5B. In block 702 the platform 400 may analyze the alert. As discussed above, the alert may take a variety of forms, including a variety of information indicating any combination of what the failure condition is, whether the failure condition is potential or occurring, and the component 1, 10, and/or 20, and/or the cause of the undesired operating condition. Analyzing the alert may allow the platform 400 to determine information useful for identifying a remedy the identified potential or occurring failure condition. For example, an alert may only indicate the existence of a potential or occurring failure condition, and prompt the platform to further analyze the received and/or manipulated operating data to determine a nature of the failure condition.

In determination block 704 the platform 400 may determine whether a remedy for the potential or occurring failure condition exists. As described herein, the platform 400 may be provided with rules/algorithms for analyzing certain operating data and/or responding to certain failure conditions. However, other operating data and/or failure conditions may not be associated with provided rules/algorithms. As such, the platform 400 may be capable of learning how to analyze the operating data and respond to identified potential or occurring failure conditions using learning models for creating and updating the rules/algorithms for the operating data and/or failure conditions. To determine whether a remedy for the potential or occurring failure condition exists, the platform may compare the information from the alert analysis to information stored correlating the remedy with the potential or occurring failure condition. The information from the alert analysis may be compared to information stored in a memory, such as the fuel cell performance database 402 or other storage device. In response to determining that a remedy for the potential or occurring failure condition exists (i.e., determination block 704="Yes"), the platform 400 may retrieve instructions for remedying the potential or occurring failure condition in block 710.

In response to determining that a remedy for the potential or occurring failure condition does not exists (i.e., determination block 704="No"), the platform 400 may execute a rule/algorithm for determining a remedy for the potential or occurring failure condition in block 706. In some embodiment, there may be multiple rules/algorithms for determining a remedy for the potential or occurring failure condition, and which one to use may depend on one or more of the failure condition, received operating data, and information of the analyzed alert. Depending on the rule/algorithm, any form or combination of the operating data may be used as inputs for the relevant rule/algorithm to create instructions for remedying potential or occurring failure condition in block 708. The created instructions maybe correlated with the relevant failure condition, operating data, and/or information of the analyzed alert, and stored in the memory. By transmitting the instructions in block 516 of method 500 in FIG. 5B, and having the instructions applied by the power generation system 2, the platform 400 may further refine the instructions for remedying the failure conditions, as described further with reference to a method 900 described relating to FIG. 9.

Figure 8:
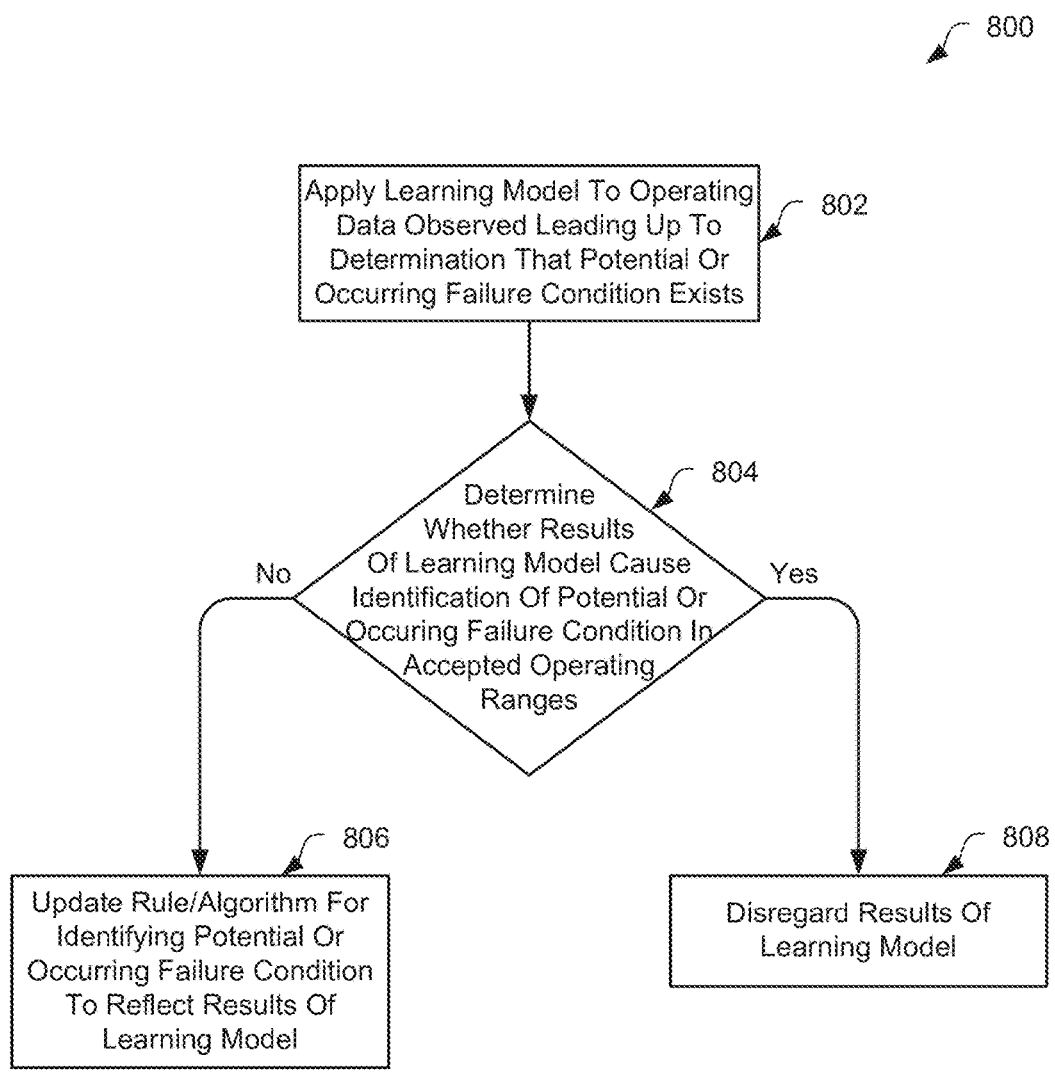
FIG. 8 is a flow chart illustrating a method for updating an algorithm/rule for identifying potential or occurring failure condition according to an embodiment.

FIG. 8 illustrates a method 800 for updating an algorithm/rule for identifying potential or occurring failure condition according to an embodiment. The method 800 may be implemented by the real-time monitoring and automated intervention platform 400 as described herein, such as by the real-time monitoring engine 404, the automated intervention engine 406, the processor, the data server 50, and the model server 60. The method 800 may be implemented as a part of block 518 of method 500 in FIG. 5B. In block 802 the platform 400 may apply a learning model to the operating data observed leading up to the determination that potential or occurring failure condition exists (as in the determination made in determination block 506 of method 500 in FIG. 5A). In some embodiments, applying the learning model to the operating data observed leading up to the determination that potential or occurring failure condition exists may be triggered after the potential or occurring failure condition is remedied (e.g., determination block 506 of method 500 in FIG. 5A="No", or determination block 508 of method 500 in FIG. 5A="Yes"). In some embodiments, applying the learning model to the operating data observed leading up to the determination that potential or occurring failure condition exists may be triggered after the transmitting instructions for remedying the potential or occurring failure condition (as in block 516 of method 500 in FIG. 5B), and, in some embodiments, after receiving operating data resulting from the implementation of the instructions (as in block 502 of method 500 in FIG. 5A).

As described above, the platform 400 may be capable of learning how to analyze the operating data and respond to identified potential or occurring failure conditions using learning models for creating and updating the rules/algorithms for the operating data and/or failure conditions. The platform 400 may use the learning models to update the rules/algorithms for using the operating data to identify the failure conditions based on operating data that precedes and leads to successful identification of the failure condition. In some embodiments, successful identification of a failure condition may be determined by successful remedying of the determined failure condition. The platform 400 may determine successful remedying of the failure condition when the operating data exhibits improving performance or no signs of the identified failure condition in response to instructions sent to the power generation system 2 for remedying the identified failure condition. In response to the improvement or remedying of the failure condition, the platform 400 retrieve relevant operating data near in time leading up to the identification of the failure condition as this data may allow for earlier detection of the potential or occurring failure condition. The learning models may be applied to the operating data leading up to the identification of the failure condition, and output values for augmenting the rules/algorithms for identifying the potential or occurring failure condition.

In determination block 804 the platform 400 may test the augmenting values from the learning model and determine whether the results of the learning model cause identification of the potential or occurring failure condition in accepted operating ranges. This test may server to validate whether or not the data leading up to the identification of the failure condition is valid data to use for earlier detection of the failure condition. In response to determining that the learning model cause identification of the potential or occurring failure condition outside of accepted operating ranges (i.e., determination block 804="No"), the platform 400 may update the rule/algorithm for identifying the potential or occurring failure condition to reflect the results of learning model in block 806. In other words, the platform 400 may augment the rule/algorithm with the results of the learning model and store the updated rule/algorithm for later use of rule/algorithm for identifying the potential or occurring failure condition. In some instances, the test may invalidate the data for use for earlier detection of the failure condition, such as by showing the identification of the failure condition occurs in accepted operating ranges. Identifying a failure condition within accepted operating ranges may lead to unnecessary and disruptive action by the platform to fix an identified failure condition when the power generation system 2 is already working as intended. In response to determining that the learning model cause identification of the potential or occurring failure condition in the accepted operating ranges (i.e., determination block 804="Yes"), the platform 400 may disregard the results of the learning model in block 808. In such instances, the platform 400 may augment the rule/algorithm for identifying the failure condition for the testing phase, but then the platform 400 may not store the changes to the rule/algorithm.

Figure 9:
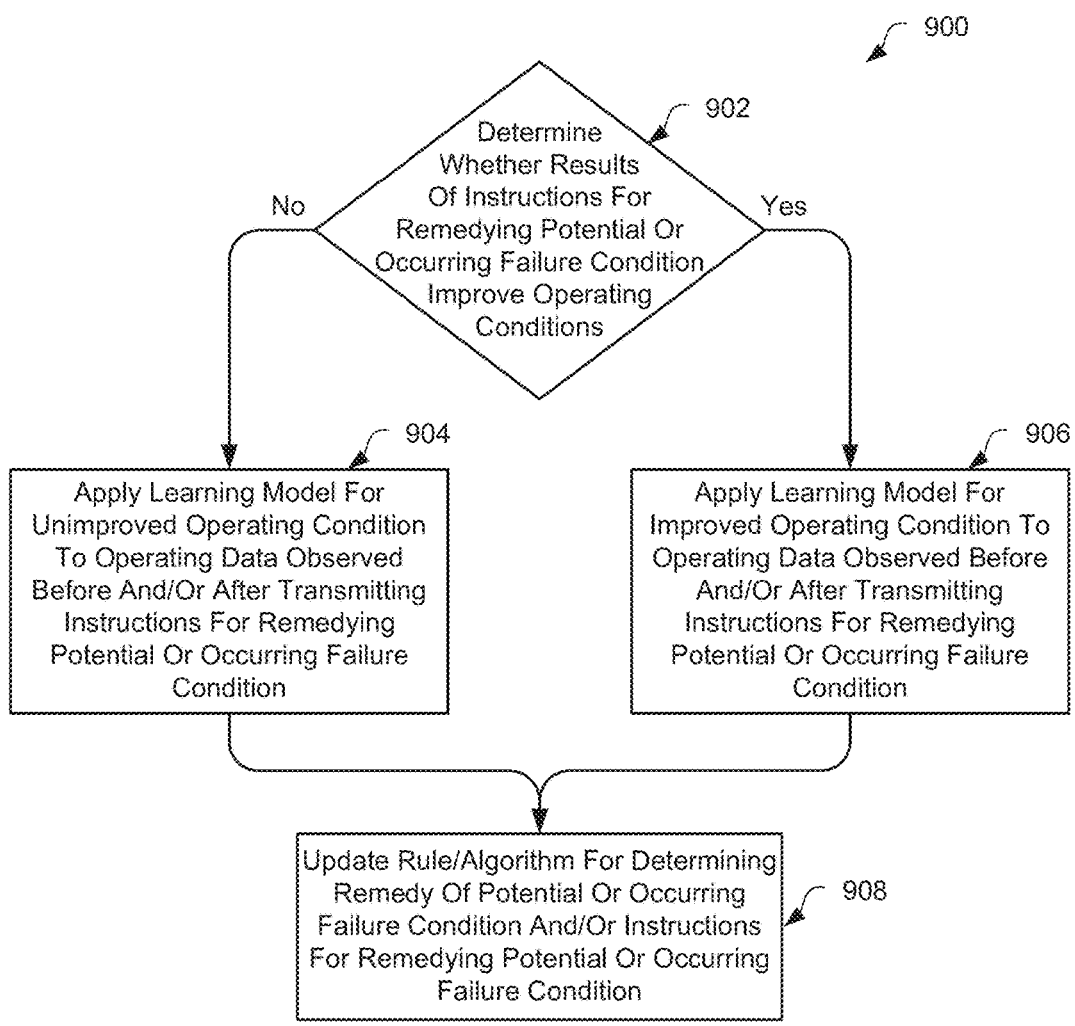
FIG. 9 is a flow chart illustrating a method for updating instructions for remedying potential or occurring failure condition according to an embodiment.

FIG. 9 illustrates a method 900 for updating instructions for remedying a potential or occurring failure condition according to an embodiment. The method 900 may be implemented by the real-time monitoring and automated intervention platform 400 as described herein, such as by the real-time monitoring engine 404, the automated intervention engine 406, the processor, the data server 50, and the model server 60. The method 900 may be implemented as a part of block 518 of method 500 in FIG. 5B. Similar to the method 800 of FIG. 8, the method 900 may be triggered after the potential or occurring failure condition is remedied (e.g., determination block 506 of method 500 in FIG. 5A="No", or determination block 508 of method 500 in FIG. 5A="Yes"). In some embodiments, the method 900 may be triggered after the transmitting instructions for remedying the potential or occurring failure condition, and, in some embodiments, after receiving operating data resulting from the implementation of the instructions. In determination block 902 the platform 400 may determine whether results of instructions for remedying a potential or occurring failure condition improves operating conditions. The platform 400 may determine successful remedying of the failure condition when the operating data exhibits improving performance or no signs of the identified failure condition in response to instructions sent to the power generation system 2 for remedying the identified failure condition. To make this determination, the platform may compare the operating data used in the first or most recent identification of an instance of the potential or occurring failure condition, to the operating data after transmitting the instructions for remedying the potential or occurring failure condition (as in block 516 of method 500 in FIG. 5B and block 502 of method 500 in FIG. 5A).

In response to determining results of instructions for remedying a potential or occurring failure condition do not improve operating conditions (i.e., determination block 902="No"), the platform 400 may apply a learning model for unimproved operating conditions to the operating data observed before and/or after transmitting instructions for remedying the potential or occurring failure condition in block 904. As described above, the platform 400 may be capable of learning how to analyze the operating data and respond to identified potential or occurring failure conditions using learning models for creating and updating the rules/algorithms for the operating data and/or failure conditions. The platform 400 may use the learning models to update the rules/algorithms for determining remedies for the failure conditions and the instructions for remedying the failure conditions based on operating data that precedes and/or follows transmitting remedy instructions of the failure condition. In some embodiments, unsuccessful identification of a remedy for the failure condition and the efficacy of the instructions for remedying the failure condition may be determined by unsuccessful remedying of the determined failure condition. The platform 400 may determine unsuccessful remedying of the failure condition when the operating data exhibits no improvement in performance or persistent signs of the identified failure condition in response to instructions sent to the power generation system 2 for remedying the identified failure condition. In response to the lack of improvement or remedying of the failure condition, the platform 400 retrieve relevant operating data preceding and/or following the transmission of the instructions for remedying the failure condition as this data may indicate a miss identified remedy and/or instructions for implementing the remedy of the failure condition. The learning models may be applied to the operating data preceding and/or following the transmission of the instructions for remedying the failure condition, and output values for augmenting the rules/algorithms for identifying the remedy for potential or occurring failure condition and augmenting the instructions for the remedy.

In block 908 the platform 400 may update the rule/algorithm for determining the remedy of the potential or occurring failure condition and/or the instructions for remedying the potential or occurring failure condition. Similar to the learning models providing augmentation to improve the processes of the platform 400 based on positive results (e.g., improved operating conditions or eliminated failure conditions), the learning models may also provide augmentation to improve the processes based on negative results (not improved or worsening operation conditions or persistent failure conditions). The platform 400 may augment the rule/algorithm and/or instructions with the results of the learning model and store the updated rule/algorithm for later use of rule/algorithm for identifying the potential or occurring failure condition.

In response to determining results of instructions for remedying a potential or occurring failure condition do improve operating conditions (i.e., determination block 902="Yes"), the platform 400 may apply a learning model for improved operating conditions to the operating data observed before and/or after transmitting instructions for remedying the potential or occurring failure condition in block 906. Applying the learning model for improved operating conditions may be implemented in much the same way as for the unimproved operating conditions in block 904. The platform 400 may use the learning models to update the rules/algorithms for determining remedies for the failure conditions and the instructions for remedying the failure conditions based on operating data that precedes and/or follows transmitting remedy instructions of the failure condition. In some embodiments, successful identification of a remedy for the failure condition and the efficacy of the instructions for remedying the failure condition may be determined by successful remedying of the determined failure condition. The platform 400 may determine successful remedying of the failure condition when the operating data exhibits improvement in performance or no signs of the identified failure condition in response to instructions sent to the power generation system 2 for remedying the identified failure condition. In response to the improvement or remedying of the failure condition, the platform 400 retrieve relevant operating data preceding and/or following the transmission of the instructions for remedying the failure condition as this data may indicate an identified remedy and/or instructions for implementing the remedy of the failure condition. The learning models may be applied to the operating data preceding and/or following the transmission of the instructions for remedying the failure condition, and output values for augmenting the rules/algorithms for identifying the remedy for potential or occurring failure condition and augmenting the instructions for the remedy. In block 908 the platform 400 may update the rule/algorithm for determining the remedy of the potential or occurring failure condition and/or the instructions for remedying the potential or occurring failure condition.

In various examples, the platform 400 may monitor for and automatically intervene for system output voltage degradation. The platform 400 may be programmed to monitor for operating conditions, such as fuel cell segment or module based instantaneous degradation rates. In response to observing rates of change or levels of area specific resistance (e.g., in units of mili-Ohm*cm/Khr) or multiple pulse width modulations in the fuel cell segments in modules 20 of a fuel cell system 10 showing higher than expected degradation, the platform 400 may determine that the fuel cell segment in module 20 is exhibiting signs of a sulfur breakthrough failure condition. The sulfur breakthrough condition may be identified as an occurring failure condition when all of the segments in each fuel cell module 20 and all modules of the fuel cell system 10 exhibit the signs of the sulfur breakthrough failure condition. The platform 400 may also detect sulfur levels in the fuel cell segment or module 20, and update the rules/algorithms for detecting sulfur breakthrough to use a combination of the voltage degradation failure condition and sulfur level measurements. In response to determining the potential or existence of sulfur breakthrough, the platform 400 may transmit instructions for implementing the use of a redundant sulfur absorbing bed as described in U.S. Provisional Patent Application No. 61/923,886, filed Jan. 6, 2014, and U.S. application Ser. No. 14/589,403, filed Jan. 5, 2015, corresponding to U.S. Published Application Number 2015/0194685 A1, published on Jul. 9, 2015, which are incorporated herein by reference. In an embodiment, the platform 400 may alert the monitoring center 408 to notify the operator to replace the sulfur absorbing bed that was broken through and prompt the operator to replace the broken through sulfur absorbing bed. In an embodiment, the platform may issue multiple alerts at various stages of identifying a potential or occurring failure condition. Continuing with the example of sulfur breakthrough, the platform 400 may issue a first alert when detecting anomalous operating conditions, such as area specific resistance or voltage degradation of fuel cell segments or modules. The first alert may be accompanied by remedying instructions or may simply be used to notify the operator at the monitoring center 408 of the potential of a sulfur breakthrough failure condition. The platform 400 may issue a second alert when detecting further anomalous operating conditions, such as temperature changes in a sulfur absorbing bed in the same fuel cell segment. The second alert may be a more definite indicator of the failure condition, and thus the second alert may be accompanied by remedying instructions for the failure condition and/or notify the operator at the monitoring center 408 to take appropriate action to remedy the failure condition.

In the above embodiment, the detection of a potential or occurring sulfur breakthrough failure condition is shown to be based on anomalies localized in modules 20 of a fuel cell system 10. In another embodiment, the platform 400 may be configured to analyze operating data across multiple fuel cell systems 10 and/or fuel cell fleets 1. In response to observing rates of change or levels of area specific resistance or multiple pulse width modulations in the fuel cell segments in modules 20 of multiple dispersed fuel cell systems 10 or fuel cells fleets 1 which share the same fuel source (e.g., the same natural gas pipeline) showing higher than expected degradation, the platform 400 may determine that the fuel cell segments in modules 20 are exhibiting signs of a fuel supply contamination failure condition. As such, the failure condition may be caused by the fuel supplying utility company, rather than failure of any of the components 1, 10, and/or 20 of the power generation system 2. In response to determining the potential or existence of a fuel supply contamination failure condition, the platform 400 may notify the fuel supplying utility company and/or the monitoring center 408 to notify the fuel supplying utility company of the fuel supply contamination failure condition. In an embodiment, the platform 400 may transmit instructions to the affected fuel cell systems 10 and/or fuel cell fleets 1 for limiting or stopping intake of the contaminated fuel supply, and/or for switching to another fuel supply.

In various examples, the platform 400 may monitor for and automatically intervene for a deviating module failure condition. The platform 400 may monitor for operating conditions that deviate between fuel cell modules 20 of a fuel cell system 10, such as instantaneous degradation rates. The platform 400 may further use the operating conditions to calculate voltage derivatives of the fuel cell modules 20 in addition to the measured operating conditions to determine a failure condition resulting from the deviating module data, such as a sharp change in the voltage derivative may indicate an occurring failure condition. Further observation of operating data, such as fuel cell module temperature or area specific resistance in a fuel cell module 20, segment, or stack, over time may lead the platform 400 to learning to distinguish between deviating modules with and without hot spots, and learning to transmit different instructions for different scenarios relating to the received operating conditions. For example, in response to detecting a deviating fuel cell module 20, the platform 400 may transmit instructions to gradually reduce fuel input for the deviating fuel cell module 20. In continuing to monitor the deviating fuel cell module, the platform 400 may determine whether the operating conditions are improving or not. For example, in response to the operating conditions improving, the platform 400 may transmit instructions to maintain the lowered fuel input. However, in response to the operating conditions deteriorating, such as development of a hot spot, the platform 400 may alter instructions and transmit instructions to increase the fuel input or revert to a previous fuel input level. Further, a deviating module which develops a hot spot may be monitored for degree of deviation and rate of change in temperature, for example.

In various examples, the platform 400 may monitor for mass flow controller drift. A mass flow controller of a fuel cell system 10 may control a fuel flow rate to every fuel cell module 20 of the fuel cell system 10. The platform 400 may do a statistical analysis of the received operating conditions over time to determine whether a component 1, 10, and/or 20 of the power generation system 2 is over supplied on undersupplied with fuel. In response to determining the potential or existence of a mass flow controller drift, the platform 400 may notify the monitoring center 408 to check the condition of the mass flow controller and/or adjust the mass flow controller to alter the amount of fuel it allows to enter the fuel cell system 10. In an embodiment, the platform 400 may transmit instructions to the affected fuel cell systems 10 for adjust the mass flow controller to alter the amount of fuel it allows to enter the fuel cell system 10.

In various embodiments, the platform 400 may connect operating conditions or failure conditions, learning that one operating condition or failure condition may affect the detection of another. In an embodiment, detecting mass flow controller drift may involve the identification of an operating condition or existing or occurring failure condition related to anode tailgas oxidizer temperature changes or levels and fuel cell segment voltage degradation occurring concurrently. In another embodiment, the platform 400 may flag the component 1, 10, and/or 20 exhibiting a failure condition so that it is not diagnosed with the other condition until the first is rectified. For example, the platform may correlate mass flow controller drift with a deviating module with a hot spot, and remove that fuel cell module 20 from consideration for mass flow controller drift. The platform 400 may also correlate anode tailgas oxidizer temperature changes or levels with mass flow controller drift, and add that as an operating data used for determining mass flow controller drift. Similarly, the platform may determine acceptable ranges of mass flow controller drift based on other factors, such as fuel usage. The platform 400 may similarly reduce the determined variance of mass flow controller drift based on fuel usage and air by removing their effects from the anode tailgas oxidizer levels.

In various examples, the platform 400 may monitor for structural failures of the fuel cell modules 20, such as fuel cell cracks or fuel cell stack seal failures. The platform 400 may monitor operating conditions of the fuel cell modules 20 related to structural failures, including output voltages or currents of the fuel cell modules 20. A sudden decrease of the output voltage or current of one fuel cell module 20 but not other modules in the same system 10 may indicate a structural failure in the module 20, and continued decreased output may be used to verify the failure condition. Identifying which of the fuel cell modules 20 exhibit the operating conditions for identifying a structural failure may aid in locating the structural failure. The platform may respond to the identification of the structural failure by sending an alert accompanied by instructions to take offline affected fuel cell module 20. In an embodiment, the platform may the operator at the monitoring center 408 to take appropriate action to remedy the failure condition, such as replacing or fixing the failed component, or notifying a service provider, such as the fuel utility provider, to replace of fix the failed component.

In various examples, the platform 400 may monitor for blower failures. The platform 400 may monitor operating conditions of an air and/or fuel recycle blower of a fuel cell system 10, including the blower's power draw or temperature. The platform 400 may monitor for variations in the blower's operating conditions, and determine a blower failure in response to changes in the blower's operating conditions. In an embodiment, the platform 400 may determine a blower failure in response to an increase in the blower's power draw and/or outlet temperature operating condition, as this may result in the blower drawing more power to attempt to maintain fuel flow in spite of a problem, such as a broken component of the blower, or a blockage in the blower. In response to determining a blower failure, the platform may transmit instructions to the affected fuel cell system 10 having the blower for limiting or stopping power to the blower. In an embodiment, the platform may transmit an alert to notify the operator at the monitoring center 408 take appropriate action to remedy the failed blower, such as replacing or fixing the failed blower, or notifying a service provider to replace of fix the failed blower.

As described herein, there may be various operating conditions on which the platform 400 may base determinations of potential or occurring failure conditions. In various embodiments, the platform 400 may use historical and/or predicted operating data for comparison with measured operating data to determine whether the measured operating data indicate a potential or occurring failure conditions. The platform 400 may also use rates of change compared with expected rates of change of the operating data, such as pre-programmed acceptable ranges or historical rates of change, to determine whether the rate of change in the operating data is indicative of a potential or occurring failure condition (e.g., sudden failure versus predicted "wear and tear" component degradation as function of operating time). In various examples, a gradual rate of change may indicate a drift in operating condition resulting from factors that may indicate a potential failure condition, such as a degradation from wear of components (e.g., sulfur breakthrough of the desulfurizer beds) of the fuel cell system 10. In various examples, a sudden rate of change may indicate occurrence of a failure condition causing quick changes in the operation of the fuel cell system 10. As described in the various embodiments herein, the historical/predicted and measured operating data and rates of change of the operating data may relate to outputs of the fuel cell system 10 (e.g., voltage and current), temperatures of components of the fuel cell system 10, and/or indicators derived from the operating conditions of the fuel cell system 10, such as area specific resistance or ATM temperature change.

In other examples, by comparing the operating conditions of different segments in one module or of different modules in the same system or of different systems or fleets, the location and type of failure conditions may be determined. Thus, a change in operating condition of one segment, module or system indicates the location and type of potential or actual failure condition. A change in operating condition of one segment but not other segments indicates that a failure is localized in one segment (e.g. structural failure or hot spot deviation). A change in operating condition of one module indicates that a failure is localized in one module (e.g., sulfur breakthrough in the desulfurizer in this module, mass flow controller drift, or blower failure). A change in operating condition of one system or fleet indicates that a failure is localized in one system or one fleet (e.g., fuel supply contamination).

In various examples, the platform 400 may be provided with a variety of rules/algorithms for different failure conditions that the platform 400 may conform to, and in some examples update. The platform 400 may provided instructions to the power generation system 2 based on the rule/algorithms and the platform's determinations. For example, in response to determining a mass flow controller failure results in an undersupply of fuel, no leaks are detected, and no deviating module with a hotspot is detected, the instructions transmitted may include to reduce fuel input. In another example, in response to determining gas composition is abnormal outside of an accepted time period, the instructions transmitted may include reduce the balance of plant load. The platform 400 may follow up with instructions to trip the fuel cell system 10 if the failure condition persists. In another example, the platform 400 may confirm sulfur breakthrough and recognize that a redundant bed is present, and transmit instructions to activate the redundant bed.

In various examples, the platform may monitor for sudden changes in process variables, catalytic partial oxidation (e.g., catalytic partial pressure oxidation (CPOx) reactor temperature oscillation during startup), output current fluctuations, and decoking indicators.

In an embodiment, the alerts to the monitor are needed to prompt the monitor to take some action that the platform 400 is not configured to instruct, or to override the platform 400. For example, in response to catalytic partial oxidation oscillation, the platform 400 may mitigate the issue by ramping down the fuel cell system balance of plant load and alert the monitor. The monitor may maintain the ability to override the platform buy placing a selected fuel cell module 20 under a no automated intervention mode.

Figure 10:
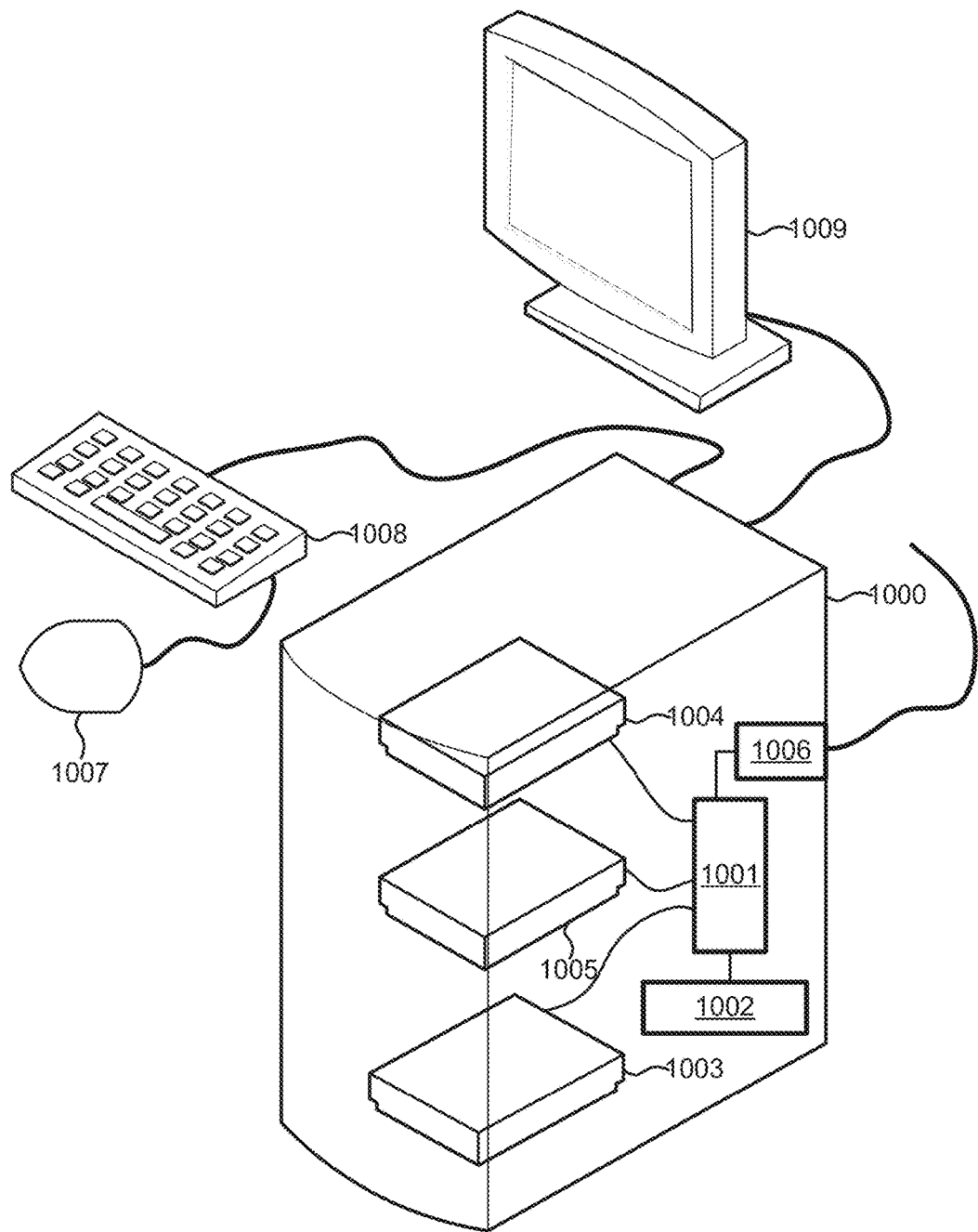
FIG. 10 is a system block diagram of a computing device suitable for use with any of the embodiments.

FIG. 10 is a block diagram of a computing device suitable for use with any of the embodiments Such a computing device 1000 typically includes a processor 1001 coupled to volatile memory 1002 and a large capacity nonvolatile memory, such as a disk drive 1003. Typically, software applications may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or FireWire® connector sockets. In a notebook configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, or a personal data assistant.

Figure 11:
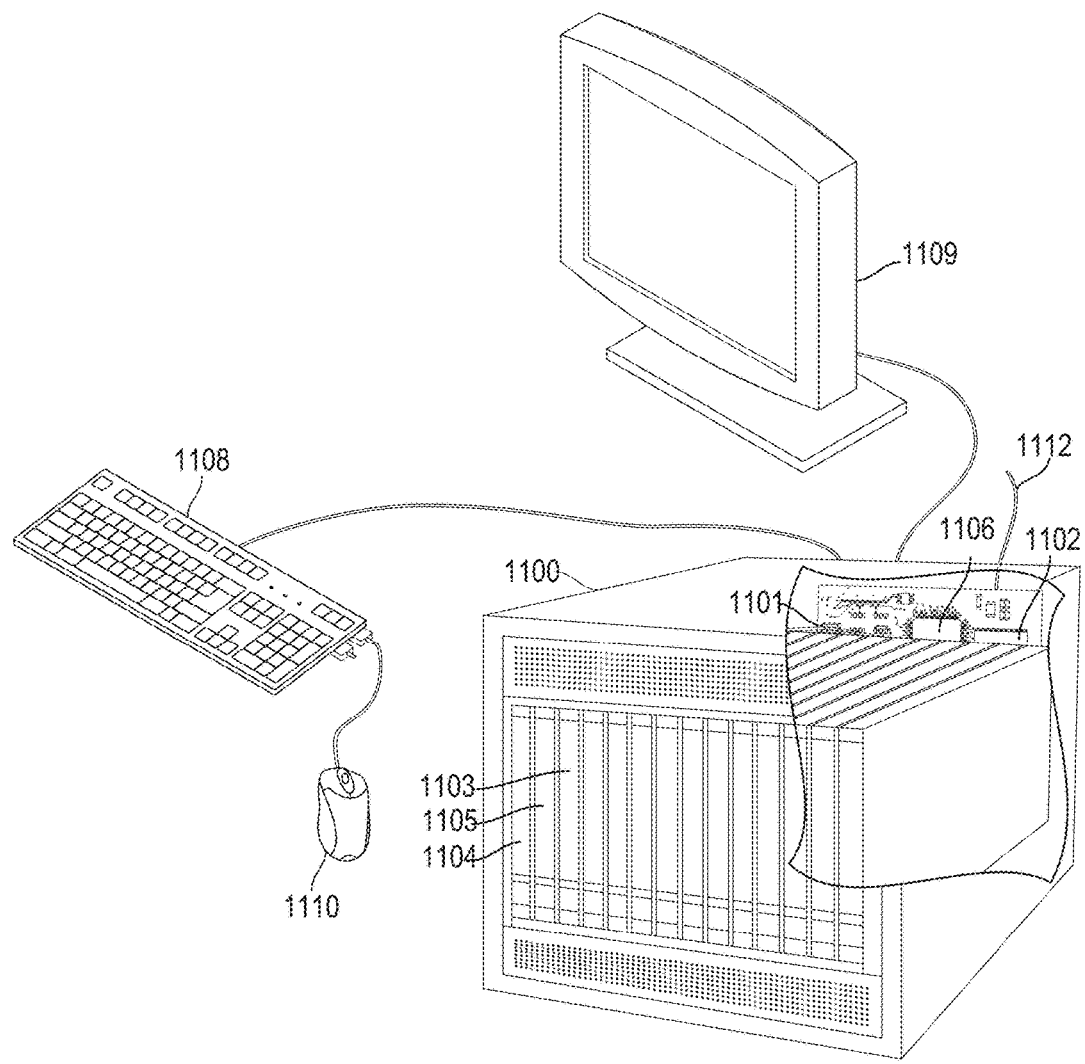
FIG. 11 is a system block diagram of a server device suitable for use with any of the embodiments.

The various embodiments may also be implemented on the on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001 and 1101 may be any programmable microprocessor, microcomputer or multiple processor chip or chips that can be configured by software instructions (applications) to perform a variety of functions, including the functions of the various embodiments described below. In some mobile receiver devices, multiple processors may be provided, such as one processor dedicated to wireless communication functions and one processor dedicated to running other applications. Typically, software applications may be stored in the internal memory 1002, 1102, and or 1103 before they are accessed and loaded into the processors 1001 and 1101. The processor 1001 and 1101 may include internal memory sufficient to store the application software instructions.

Figure 12:
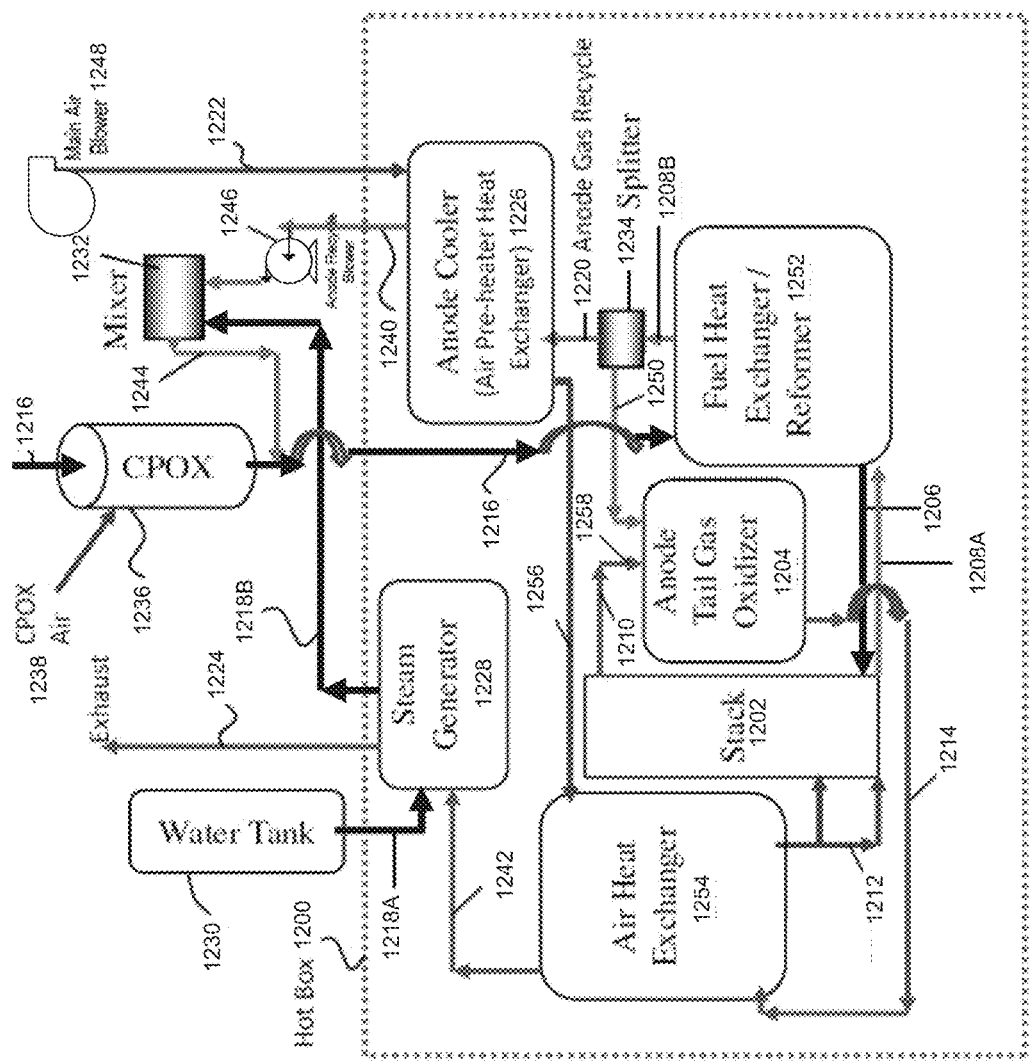
FIG. 12 is a block diagram illustrating various components and flows through a fuel cell system according to an embodiment.

FIG. 12 is a block diagram illustrating various components and flows through a fuel cell system 10 which can be controlled according to the present embodiments. The system 10 is also illustrated and described in U.S. application Ser. No. 14/054,010, filed Oct. 15, 2013, incorporated herein by reference. As illustrated in FIG. 12, fuel and air are supplied to a fuel cell stack 1202 housed in a hot box 1200. The hot box 1200 contains the plurality of the fuel cell stacks 1202, such as solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni—SSZ cermet, and a cathode electrode, such as lanthanum strontium manganite (LSM)). The stacks 1202 may be arranged over each other in a plurality of columns.

The hot box 1200 also contains a steam generator 1228. The steam generator 1228 is provided with water through conduit 1218A from a water source 1230, such as a water tank or a water pipe (i.e., a continuous water supply), and converts the water to steam. The steam is provided from generator 1228 to mixer 1232 through conduit 1218B and is mixed with the stack anode (fuel) recycle stream in the mixer 1232. The mixer 1232 may be located inside or outside of the hot box 1200. Preferably, the humidified anode exhaust stream is combined with the fuel inlet stream in the fuel inlet line or conduit 1216 downstream of the mixer 1232, as schematically shown in FIG. 12. Alternatively, if desired, the fuel inlet stream may also be provided directly into the mixer 1232, or the steam may be provided directly into the fuel inlet stream and/or the anode exhaust stream may be provided directly into the fuel inlet stream followed by humidification of the combined fuel streams.

The steam generator 1228 is heated by the hot anode tailgas oxidizer (ATO) 1204 exhaust stream which is passed in heat exchange relationship in conduit 1242 with the steam generator 1228.

The system operates as follows. The fuel inlet stream, such as a hydrocarbon stream, for example natural gas, is provided into the fuel inlet conduit 1216 and through a catalytic partial pressure oxidation (CPOx) reactor 1236 located outside the hot box 1200. During system start up, air is also provided into the CPOx reactor 1236 through CPOx air inlet conduit 1238 to catalytically partially oxidize the fuel inlet stream. During steady state system operation, the air flow is turned off and the CPOx reactor acts as a fuel passage way in which the fuel is not partially oxidized. Thus, the hot box 1200 may comprise only one fuel inlet conduit which provides fuel in both start-up and steady state modes through the CPOx reactor 1236. Therefore a separate fuel inlet conduit which bypasses the CPOx reactor during steady state operation is not required.

The fuel inlet stream is provided into the fuel heat exchanger (anode recuperator)/pre-reformer 1252 where its temperature is raised by heat exchange with the stack 1202 anode (fuel) exhaust stream. The fuel inlet stream is pre-reformed in the pre-reformer section of the heat exchanger 1252 via the SMR reaction and the reformed fuel inlet stream (which includes hydrogen, carbon monoxide, water vapor and unreformed methane) is provided into the stacks 1202 through the fuel inlet conduit(s) 1206. Additional reformation catalyst may be located in conduit(s) 1206. The fuel inlet stream travels upwards through the stacks through fuel inlet risers in the stacks 1202 and is oxidized in the stacks 1202 during electricity generation. The oxidized fuel (i.e., the anode or fuel exhaust stream) travels down the stacks 1202 through the fuel exhaust risers and is then exhausted from the stacks through the fuel exhaust conduit(s) 1208A into the fuel heat exchanger 1252.

In the fuel heat exchanger 1252, the anode exhaust stream heats the fuel inlet stream via heat exchange. The anode exhaust stream is then provided via the fuel exhaust conduit 1208B into a splitter 1234. A first portion of the anode exhaust stream is provided from the splitter 1234 into the ATO 1204 via conduit (e.g., slits) 1250.

A second portion of the anode exhaust stream is recycled from the splitter 1234 into the anode cooler 1226 and then into the fuel inlet stream. For example, the second portion of the anode exhaust stream is recycled through conduit 1220 into the anode cooler (i.e., air pre-heater heat exchanger) where the anode exhaust stream pre-heats the air inlet stream from conduit 1222. The anode exhaust stream is then provided by the anode recycle blower 1246 into the mixer 1232. The anode exhaust stream is humidified in the mixer 1232 by mixing with the steam provided from the steam generator 1228. The humidified anode exhaust stream is then provided from the mixer 1232 via humidified anode exhaust stream conduit 1244 into the fuel inlet conduit 1216 where it mixes with the fuel inlet stream.

The air inlet stream is provided by a main air blower 1248 from the air inlet conduit 1222 into the anode cooler heat exchanger 1226. The blower 1248 may comprise the single air flow controller for the entire system. In the anode cooler heat exchanger 1226, the air inlet stream is heated by the anode exhaust stream via heat exchange. The heated air inlet stream is then provided into the air heat exchanger (cathode recuperator 1254) via conduit 1255. The heated air inlet stream is provided from heat exchanger 1254 into the stack(s) 1202 via the air inlet conduit and/or manifold 1212.

The air passes through the stacks 1202 into the cathode exhaust conduit 1210 and through conduit 1210 and mixer 1258 into the ATO 1204. In the ATO 1204, the air exhaust stream oxidizes the split first portion of the anode exhaust stream from conduit 1250 to generate an ATO exhaust stream. The ATO exhaust stream is exhausted through the ATO exhaust conduit 1214 into the air heat exchanger 1254. The ATO exhaust stream heats air inlet stream in the air heat exchanger 1254 via heat exchange. The ATO exhaust stream (which is still above room temperature) is then provided from the air heat exchanger 1254 to the steam generator 1228 via conduit 1242. The heat from the ATO exhaust stream is used to convert the water into steam via heat exchange in the steam generator 1228. The ATO exhaust stream is then removed from the system via the exhaust conduit 1224. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 1222 by blower 1248 can be used to control the temperature of the stacks 1202 and the ATO 1204.

Thus, varying the main air flow in conduit 1222 using a variable speed blower 1248 and/or a control valve may be used to maintain the stack 1202 temperature and/or ATO 1204 temperature. The main air flow rate control via blower 1248 or valve acts as a main system temperature controller. Furthermore, the ATO 1204 temperature may be controlled by varying the fuel utilization (e.g., ratio of current generated by the stack(s) 1202 to fuel inlet flow provided to the stack(s) 1202). Finally the anode recycle flow in conduits 1220 and 1240 may be controlled by a variable speed anode recycle blower 1246 and/or a control valve to control the split between the anode exhaust to the ATO 1204 and anode exhaust for anode recycle into the mixer 1232 and the fuel inlet conduit 1216.

In this embodiment, there are no external fuel and air inputs to the ATO 1204. Thus, in contrast to prior art systems, external natural gas or another external fuel is not fed to the ATO 1204. Instead, the hot fuel (anode) exhaust stream from the fuel cell stack(s) 1202 is partially recycled into the ATO as the ATO fuel inlet stream. Likewise, there is no outside air input into the ATO. Instead, the hot air (cathode) exhaust stream from the fuel cell stack(s) 1202 is provided into the ATO as the ATO air inlet stream.

Furthermore, the fuel exhaust stream is split in a splitter 1234 located in the hot box 1200. The splitter 1234 is located between the fuel exhaust outlet of the anode recuperator (e.g., fuel heat exchanger) 1252 and the fuel exhaust inlet of the anode cooler 1226 (e.g., the air pre-heater heat exchanger). Thus, the fuel exhaust stream is split between the mixer 1232 and the ATO 1204 prior to entering the anode cooler 1226. This allows higher temperature fuel exhaust stream to be provided into the ATO 1204 than in the prior art because the fuel exhaust stream has not yet exchanged heat with the air inlet stream in the anode cooler 1226. For example, the fuel exhaust stream provided into the ATO 1204 from the splitter 1234 may have a temperature of above 350 C, such as 350-500 C, for example 375 to 425 C, such as 390-410 C. Furthermore, since a smaller amount of fuel exhaust is provided into the anode cooler 1226 (e.g., not 100% of the anode exhaust is provided into the anode cooler due to the splitting of the anode exhaust in splitter 1234), the heat exchange area of the anode cooler 1226 described above may be reduced.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for monitoring a power generation system, comprising:
   receiving operating data from at least one component of the power generation system;
   determining whether real-time operating data of the received operating data indicates a potential failure condition for at least one of the components before an occurrence of a failure condition by:
     determining whether any portion of the received operating data is in an accepted operating range;
     in response to determining that the real-time operating data of the received operating data is not in an accepted operating range:
       determining whether an algorithm for determining whether real-time operating data of the received operating data indicates a potential failure condition is available;
       in response to determining the algorithm for determining whether the real-time operating data indicates the potential failure condition is unavailable:
         correlating the real-time operating data with the potential failure condition; and
         creating the algorithm for determining whether the real-time operating data indicates the potential failure condition; and
       executing the algorithm for determining whether the real-time operating data indicates the potential failure condition;
   issuing a first alert in response to determining the real-time operating data indicates the potential failure condition or transmitting instructions for remedying the potential failure condition to the power generation system; and
   updating the algorithm for determining whether the real-time operating data indicates the potential failure condition using preceding operating data in response to determining the real-time operating data indicates the potential failure condition, wherein the preceding operating data is part of the received operating data that is received before the real-time operating data part of the received operating data.

2. The method of claim 1, further comprising:
   determining whether the instructions for remedying the potential failure condition are available;
   retrieving the instructions for remedying the potential failure condition from a storage device in response to determining the instructions for remedying the potential failure condition are available;
   executing an algorithm for determining the remedy for the potential failure condition in response to determining the instructions for remedying the potential failure condition are unavailable; and
   creating the instructions for remedying the potential failure condition.

3. The method of claim 2, further comprising:
   determining whether third operating data of the received operating data received after transmitting the instructions for remedying the potential failure condition to the power generation system indicates improvement in the operating condition of the at least one of the components; and
   updating the instructions for remedying the potential failure condition using the preceding operating data in response to determining the third operating data indicates improvement in the operating condition of the at least one of the components.

4. The method of claim 3, wherein updating the algorithm for determining whether the real-time operating data indicates the potential failure condition using preceding operating data and updating the instructions for remedying the potential failure condition using the preceding operating data comprise executing at least one learning model using the preceding operating data to produce augmented parameters for the algorithm for determining whether the real-time operating data indicates the potential failure condition and the instructions for remedying the potential failure condition.

5. The method of claim 1, further comprising:
determining whether third operating data of the received operating data received after transmitting the instructions for remedying the potential failure condition to the power generation system data indicates a second potential failure condition;
determining whether the potential failure condition indicated by the real-time operating data has ceased in response to determining the third operating data does indicate the second potential failure;
cancelling the first alert in response to determining the third operating data does not indicate the second potential failure condition or in response to determining the potential failure condition indicated by the real-time operating data has ceased;
determining whether the third operating data indicates the same potential failure condition as indicated by the real-time operating data in response to determining the third operating data indicates the second potential failure condition;
issuing a second alert in response to determining the second potential failure condition indicated by the third operating data is different from the potential failure condition as indicated by the real-time operating data.

6. The method of claim 5, further comprising suppressing one of the first alert and the second alert having a lower priority than the other of the first alert and second alert.

7. The method of claim 1, wherein the power generation system comprises at least one fuel cell system, wherein the at least one fuel cell system comprises:
a blower which provides an air inlet stream into the fuel cell system;
a catalytic partial pressure oxidation (CPOx) reactor which partially oxidizes a fuel inlet stream during a start up mode;
a plurality of fuel cell modules, wherein each fuel cell module comprises:
a plurality of fuel cell stacks which generate electricity by oxidizing the fuel inlet stream; and
an anode tailgas oxidizer which oxidizes an anode exhaust stream using a cathode exhaust stream from the fuel cell stacks;
a mass flow controller which controls the fuel inlet stream flow rate to the each of the plurality of fuel cell modules;
a controller configured to control operating conditions of fuel cell system components including the blower, the CPOx reactor, the fuel cell stacks, the anode tailgas oxidizer, and/or the mass flow controller; and
a gateway configured to provide a bi-directional link with a remote server, transmit real-time operational data of the fuel cell system components, and receive the instructions for remedying the potential failure condition.

8. The method of claim 7, wherein:
receiving operating data from at least one component of the power generation system comprises receiving a voltage output of a plurality of fuel cell modules of the fuel cell system sharing one desulfurizer;
determining whether real-time operating data of the received operating data indicates a potential failure condition for at least one of the components before an occurrence of a failure condition comprises determining whether a rate of change in a calculated area specific resistance based on the voltage output of the plurality of fuel cell modules exceeds an accepted rate of change of area specific resistance indicating a potential sulfur breakthrough failure condition in the desulfurizer; and
issuing a first alert in response to determining the real-time operating data indicates the potential failure condition or transmitting instructions for remedying the potential failure condition to the power generation system comprises issuing the first alert indicating a potential sulfur breakthrough failure condition or transmitting instructions to activate a redundant sulfur absorbing bed.

9. The method of claim 7, wherein:
receiving operating data from at least one component of the power generation system comprises receiving a voltage output of a plurality of fuel cell systems or fleets which share the same fuel source;
determining whether real-time operating data of the received operating data indicates a potential failure condition for at least one of the components before an occurrence of a failure condition comprises determining whether a rate of change in a calculated area specific resistance based on the voltage output of the plurality of fuel cell systems or fleets exceeds an accepted rate of change of area specific resistance indicating potential fuel contamination; and
issuing a first alert in response to determining the real-time operating data indicates the potential failure condition or transmitting instructions for remedying the potential failure condition to the power generation system comprises issuing the first alert indicating a potential fuel contamination prompting reporting to a fuel utility provider or transmitting instructions to reduce or eliminate fuel input to the plurality of fuel cell systems or fleets.

10. The method of claim 7, wherein:
receiving operating data from at least one component of the power generation system comprises receiving a voltage output and ATO temperature of a fuel cell module;
determining whether real-time operating data of the received operating data indicates a potential failure condition for at least one of the components before an occurrence of a failure condition comprises determining whether the ATO temperature exceeds an accepted temperature and whether the voltage output exceeds an accepted voltage output indicating a potential mass flow controller drift in fuel supply to the fuel cell module; and
issuing a first alert in response to determining the real-time operating data indicates the potential failure condition or transmitting instructions for remedying the potential failure condition to the power generation system comprises issuing the first alert indicating the a potential mass flow controller drift or transmitting instructions to reduce the flow of fuel to the fuel cell module.

11. The method of claim 7, wherein:
receiving operating data from at least one component of the power generation system comprises receiving at least one of a temperature or power draw of the blower;
determining whether real-time operating data of the received operating data indicates a potential failure condition for at least one of the components before an occurrence of a failure condition comprises determining whether the at least one of a temperature or power draw of the blower exceeds an accepted at least one of a temperature or power draw indicating a potential blower malfunction;

issuing a first alert in response to determining the real-time operating data indicates the potential failure condition or transmitting instructions for remedying the potential failure condition to the power generation system comprises issuing the first alert indicating a potential blower malfunction or transmitting instructions to reduce power provided to the blower.

12. The method of claim 7, wherein:

receiving operating data from at least one component of the power generation system comprises receiving a voltage output of a fuel cell module;

determining whether real-time operating data of the received operating data indicates a potential failure condition for at least one of the components before an occurrence of a failure condition comprises determining whether a variation of the voltage output over time exceeds an accepted rate of change in voltage output of a first module or segment but not of other modules or segments of the same fuel cell system indicating a potential crack in a fuel cell or seal failure in the first fuel cell module or segment; and issuing a first alert in response to determining the real-time operating data indicates the potential failure condition or transmitting instructions for remedying the potential failure condition to the power generation system comprises issuing the first alert indicating a potential crack in the fuel cell or seal failure in the first fuel cell module or segment or transmitting instructions to reduce or eliminate the flow of fuel to the fuel cell module.

13. A method for monitoring a power generation system, comprising:

receiving operating data from at least one component of the power generation system;

determining whether real-time operating data of the received operating data indicates a potential failure condition for at least one of the components before an occurrence of a failure condition;

issuing a first alert in response to determining the real-time operating data indicates the potential failure condition or transmitting instructions for remedying the potential failure condition to the power generation system; and updating an algorithm for determining whether the real-time operating data indicates the potential failure condition using preceding operating data in response to determining the real-time operating data indicates the potential failure condition, wherein the preceding operating data is part of the received operating data that is received before the real-time operating data part of the received operating data;

wherein:

the power generation system comprises at least one fuel cell system, wherein the at least one fuel cell system comprises:

a blower which provides an air inlet stream into the fuel cell system;

a catalytic partial pressure oxidation (CPOx) reactor which partially oxidizes a fuel inlet stream during a start up mode;

a plurality of fuel cell modules, wherein each fuel cell module comprises:

a plurality of fuel cell stacks which generate electricity by oxidizing the fuel inlet stream; and an anode tailgas oxidizer which oxidizes an anode exhaust stream using a cathode exhaust stream from the fuel cell stacks;

a mass flow controller which controls the fuel inlet stream flow rate to the each of the plurality of fuel cell modules;

a controller configured to control operating conditions of fuel cell system components including the blower, the CPOx reactor, the fuel cell stacks, the anode tailgas oxidizer, and/or the mass flow controller; and a gateway configured to provide a bi-directional link with a remote server, transmit real-time operational data of the fuel cell system components, and receive the instructions for remedying the potential failure condition;

receiving operating data from at least one component of the power generation system comprises receiving a voltage output of a plurality of fuel cell modules of the fuel cell system sharing one desulfurizer;

determining whether real-time operating data of the received operating data indicates a potential failure condition for at least one of the components before an occurrence of a failure condition comprises determining whether a rate of change in a calculated area specific resistance based on the voltage output of the plurality of fuel cell modules exceeds an accepted rate of change of area specific resistance indicating a potential sulfur breakthrough failure condition in the desulfurizer; and issuing a first alert in response to determining the real-time operating data indicates the potential failure condition or transmitting instructions for remedying the potential failure condition to the power generation system comprises issuing the first alert indicating a potential sulfur breakthrough failure condition or transmitting instructions to activate a redundant sulfur absorbing bed.

14. A method for monitoring a power generation system, comprising:

receiving operating data from at least one component of the power generation system;

determining whether real-time operating data of the received operating data indicates a potential failure condition for at least one of the components before an occurrence of a failure condition;

issuing a first alert in response to determining the real-time operating data indicates the potential failure condition or transmitting instructions for remedying the potential failure condition to the power generation system; and updating an algorithm for determining whether the real-time operating data indicates the potential failure condition using preceding operating data in response to determining the real-time operating data indicates the potential failure condition, wherein the preceding operating data is part of the received operating data that is received before the real-time operating data part of the received operating data;

wherein:

the power generation system comprises at least one fuel cell system, wherein the at least one fuel cell system comprises:
- a blower which provides an air inlet stream into the fuel cell system;
- a catalytic partial pressure oxidation (CPOx) reactor which partially oxidizes a fuel inlet stream during a start up mode;
- a plurality of fuel cell modules, wherein each fuel cell module comprises:
  - a plurality of fuel cell stacks which generate electricity by oxidizing the fuel inlet stream; and
  - an anode tailgas oxidizer which oxidizes an anode exhaust stream using a cathode exhaust stream from the fuel cell stacks;
- a mass flow controller which controls the fuel inlet stream flow rate to the each of the plurality of fuel cell modules;
- a controller configured to control operating conditions of fuel cell system components including the blower, the CPOx reactor, the fuel cell stacks, the anode tailgas oxidizer, and/or the mass flow controller; and
- a gateway configured to provide a bi-directional link with a remote server, transmit real-time operational data of the fuel cell system components, and receive the instructions for remedying the potential failure condition;

receiving operating data from at least one component of the power generation system comprises receiving a voltage output of a plurality of fuel cell systems or fleets which share the same fuel source;

determining whether real-time operating data of the received operating data indicates a potential failure condition for at least one of the components before an occurrence of a failure condition comprises determining whether a rate of change in a calculated area specific resistance based on the voltage output of the plurality of fuel cell systems or fleets exceeds an accepted rate of change of area specific resistance indicating potential fuel contamination; and issuing a first alert in response to determining the real-time operating data indicates the potential failure condition or transmitting instructions for remedying the potential failure condition to the power generation system comprises issuing the first alert indicating a potential fuel contamination prompting reporting to a fuel utility provider or transmitting instructions to reduce or eliminate fuel input to the plurality of fuel cell systems or fleets.

15. A method for monitoring a power generation system, comprising:
receiving operating data from at least one component of the power generation system;
determining whether real-time operating data of the received operating data indicates a potential failure condition for at least one of the components before an occurrence of a failure condition;
issuing a first alert in response to determining the real-time operating data indicates the potential failure condition or transmitting instructions for remedying the potential failure condition to the power generation system; and
updating an algorithm for determining whether the real-time operating data indicates the potential failure condition using preceding operating data in response to determining the real-time operating data indicates the potential failure condition, wherein the preceding operating data is part of the received operating data that is received before the real-time operating data part of the received operating data;

wherein:
the power generation system comprises at least one fuel cell system, wherein the at least one fuel cell system comprises:
- a blower which provides an air inlet stream into the fuel cell system;
- a catalytic partial pressure oxidation (CPOx) reactor which partially oxidizes a fuel inlet stream during a start up mode;
- a plurality of fuel cell modules, wherein each fuel cell module comprises:
  - a plurality of fuel cell stacks which generate electricity by oxidizing the fuel inlet stream; and
  - an anode tailgas oxidizer which oxidizes an anode exhaust stream using a cathode exhaust stream from the fuel cell stacks;
- a mass flow controller which controls the fuel inlet stream flow rate to the each of the plurality of fuel cell modules;
- a controller configured to control operating conditions of fuel cell system components including the blower, the CPOx reactor, the fuel cell stacks, the anode tailgas oxidizer, and/or the mass flow controller; and
- a gateway configured to provide a bi-directional link with a remote server, transmit real-time operational data of the fuel cell system components, and receive the instructions for remedying the potential failure condition;

receiving operating data from at least one component of the power generation system comprises receiving a voltage output and ATO temperature of a fuel cell module;

determining whether real-time operating data of the received operating data indicates a potential failure condition for at least one of the components before an occurrence of a failure condition comprises determining whether the ATO temperature exceeds an accepted temperature and whether the voltage output exceeds an accepted voltage output indicating a potential mass flow controller drift in fuel supply to the fuel cell module; and issuing a first alert in response to determining the real-time operating data indicates the potential failure condition or transmitting instructions for remedying the potential failure condition to the power generation system comprises issuing the first alert indicating the a potential mass flow controller drift or transmitting instructions to reduce the flow of fuel to the fuel cell module.

16. A method for monitoring a power generation system, comprising:
receiving operating data from at least one component of the power generation system;
determining whether real-time operating data of the received operating data indicates a potential failure condition for at least one of the components before an occurrence of a failure condition;
issuing a first alert in response to determining the real-time operating data indicates the potential failure condition or transmitting instructions for remedying the potential failure condition to the power generation system; and updating an algorithm for determining whether the real-time operating data indicates the potential failure condition using preceding operating data in response to determining the real-time operating data indicates the potential failure condition, wherein the preceding operating data is part of the received operating data that is received before the real-time operating data part of the received operating data;

wherein:
the power generation system comprises at least one fuel cell system, wherein the at least one fuel cell system comprises:
a blower which provides an air inlet stream into the fuel cell system;
a catalytic partial pressure oxidation (CPOx) reactor which partially oxidizes a fuel inlet stream during a start up mode;
a plurality of fuel cell modules, wherein each fuel cell module comprises:
a plurality of fuel cell stacks which generate electricity by oxidizing the fuel inlet stream; and
an anode tailgas oxidizer which oxidizes an anode exhaust stream using a cathode exhaust stream from the fuel cell stacks;
a mass flow controller which controls the fuel inlet stream flow rate to the each of the plurality of fuel cell modules;
a controller configured to control operating conditions of fuel cell system components including the blower, the CPOx reactor, the fuel cell stacks, the anode tailgas oxidizer, and/or the mass flow controller; and
a gateway configured to provide a bi-directional link with a remote server, transmit real-time operational data of the fuel cell system components, and receive the instructions for remedying the potential failure condition;

receiving operating data from at least one component of the power generation system comprises receiving at least one of a temperature or power draw of the blower;

determining whether real-time operating data of the received operating data indicates a potential failure condition for at least one of the components before an occurrence of a failure condition comprises determining whether the at least one of a temperature or power draw of the blower exceeds an accepted at least one of a temperature or power draw indicating a potential blower malfunction;

issuing a first alert in response to determining the real-time operating data indicates the potential failure condition or transmitting instructions for remedying the potential failure condition to the power generation system comprises issuing the first alert indicating a potential blower malfunction or transmitting instructions to reduce power provided to the blower.

17. A method for monitoring a power generation system, comprising:
receiving operating data from at least one component of the power generation system;
determining whether real-time operating data of the received operating data indicates a potential failure condition for at least one of the components before an occurrence of a failure condition;

issuing a first alert in response to determining the real-time operating data indicates the potential failure condition or transmitting instructions for remedying the potential failure condition to the power generation system; and updating an algorithm for determining whether the real-time operating data indicates the potential failure condition using preceding operating data in response to determining the real-time operating data indicates the potential failure condition, wherein the preceding operating data is part of the received operating data that is received before the real-time operating data part of the received operating data;

wherein:
the power generation system comprises at least one fuel cell system, wherein the at least one fuel cell system comprises:
a blower which provides an air inlet stream into the fuel cell system;
a catalytic partial pressure oxidation (CPOx) reactor which partially oxidizes a fuel inlet stream during a start up mode;
a plurality of fuel cell modules, wherein each fuel cell module comprises:
a plurality of fuel cell stacks which generate electricity by oxidizing the fuel inlet stream; and
an anode tailgas oxidizer which oxidizes an anode exhaust stream using a cathode exhaust stream from the fuel cell stacks;
a mass flow controller which controls the fuel inlet stream flow rate to the each of the plurality of fuel cell modules;
a controller configured to control operating conditions of fuel cell system components including the blower, the CPOx reactor, the fuel cell stacks, the anode tailgas oxidizer, and/or the mass flow controller; and
a gateway configured to provide a bi-directional link with a remote server, transmit real-time operational data of the fuel cell system components, and receive the instructions for remedying the potential failure condition;

receiving operating data from at least one component of the power generation system comprises receiving a voltage output of a fuel cell module;

determining whether real-time operating data of the received operating data indicates a potential failure condition for at least one of the components before an occurrence of a failure condition comprises determining whether a variation of the voltage output over time exceeds an accepted rate of change in voltage output of a first module or segment but not of other modules or segments of the same fuel cell system indicating a potential crack in a fuel cell or seal failure in the first fuel cell module or segment; and issuing a first alert in response to determining the real-time operating data indicates the potential failure condition or transmitting instructions for remedying the potential failure condition to the power generation system comprises issuing the first alert indicating a potential crack in the fuel cell or seal failure in the first fuel cell module or segment or transmitting instructions to reduce or eliminate the flow of fuel to the fuel cell module.

\* \* \* \* \*